United States Patent [19]
Beaufrere

[11] 3,939,904
[45] Feb. 24, 1976

[54] ROTARY DISC REGENERATOR

[76] Inventor: Albert H. Beaufrere, Private Road, Huntington, N.Y. 11743

[22] Filed: Mar. 18, 1974

[21] Appl. No.: 452,352

Related U.S. Application Data

[62] Division of Ser. No. 300,774, Oct. 25, 1972, Pat. No. 3,818,696.

[52] U.S. Cl. .............................. 165/9; 165/10
[51] Int. Cl.² ................................ F28D 19/00
[58] Field of Search ........................... 165/8, 9, 10

[56] References Cited
UNITED STATES PATENTS

| | | |
|---|---|---|
| 2,951,686 | 9/1960 | Sandmann et al. ............... 165/9 X |
| 3,246,686 | 4/1966 | Kalbfleisch et al. ................. 165/9 |
| 3,250,316 | 5/1966 | Nyberg ............................ 165/9 |
| 3,280,895 | 10/1966 | Chen et al. ....................... 165/9 |
| 3,301,317 | 1/1967 | Weaving et al. ............... 165/9 X |
| 3,409,073 | 11/1968 | Botbachik ......................... 165/9 |
| 3,511,309 | 5/1970 | Clifford et al. .................... 165/9 |

*Primary Examiner*—Albert W. Davis, Jr.

[57] ABSTRACT

Rotary disc regenerator, and regenerative air-cooled gas turbine engines embodying the same, characterized by non-rubbing seals which are effective to minimize air-to-exhaust leakage and make it possible to employ a sheet metal matrix as the heat exchange means of the regenerator.

13 Claims, 28 Drawing Figures

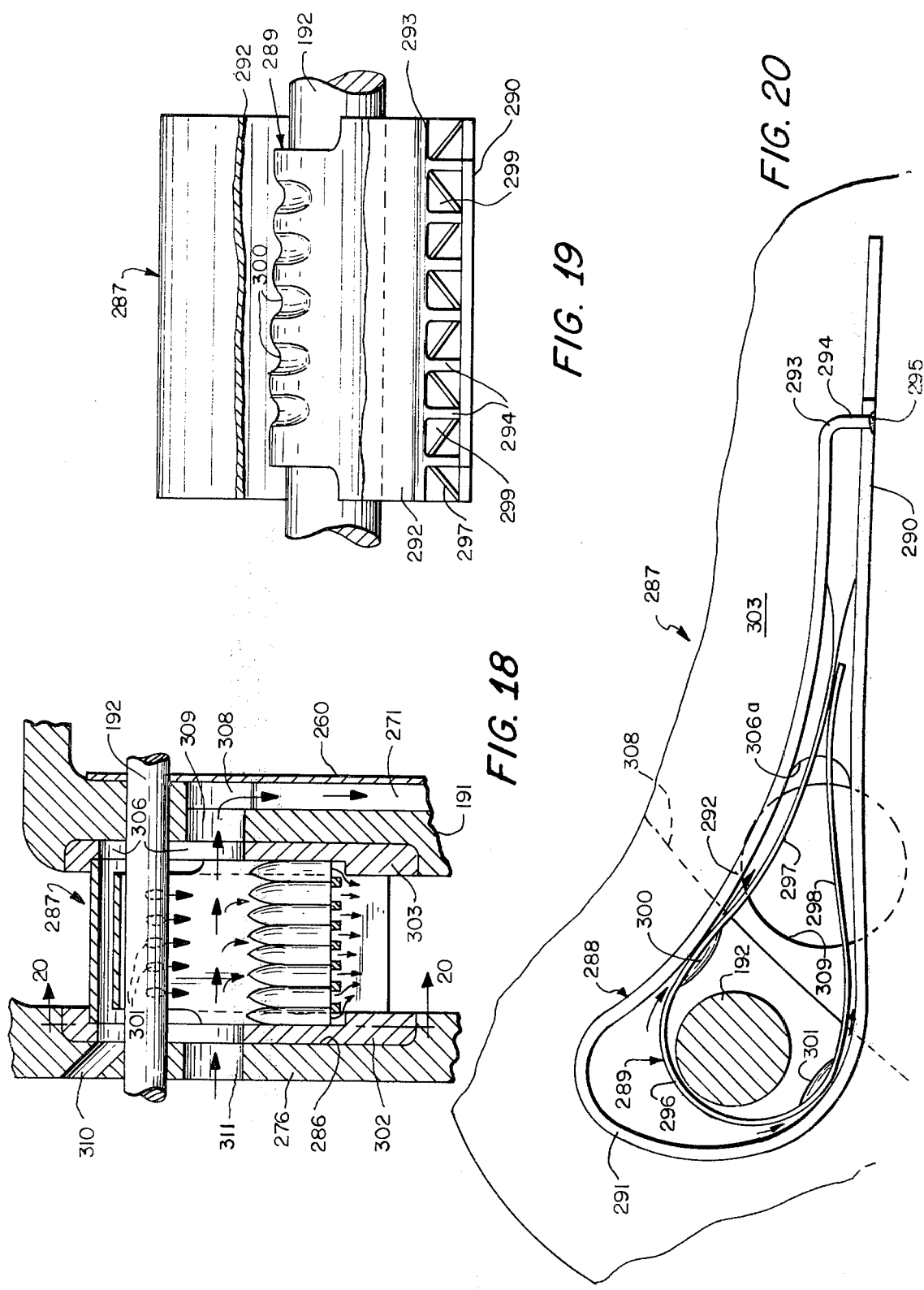

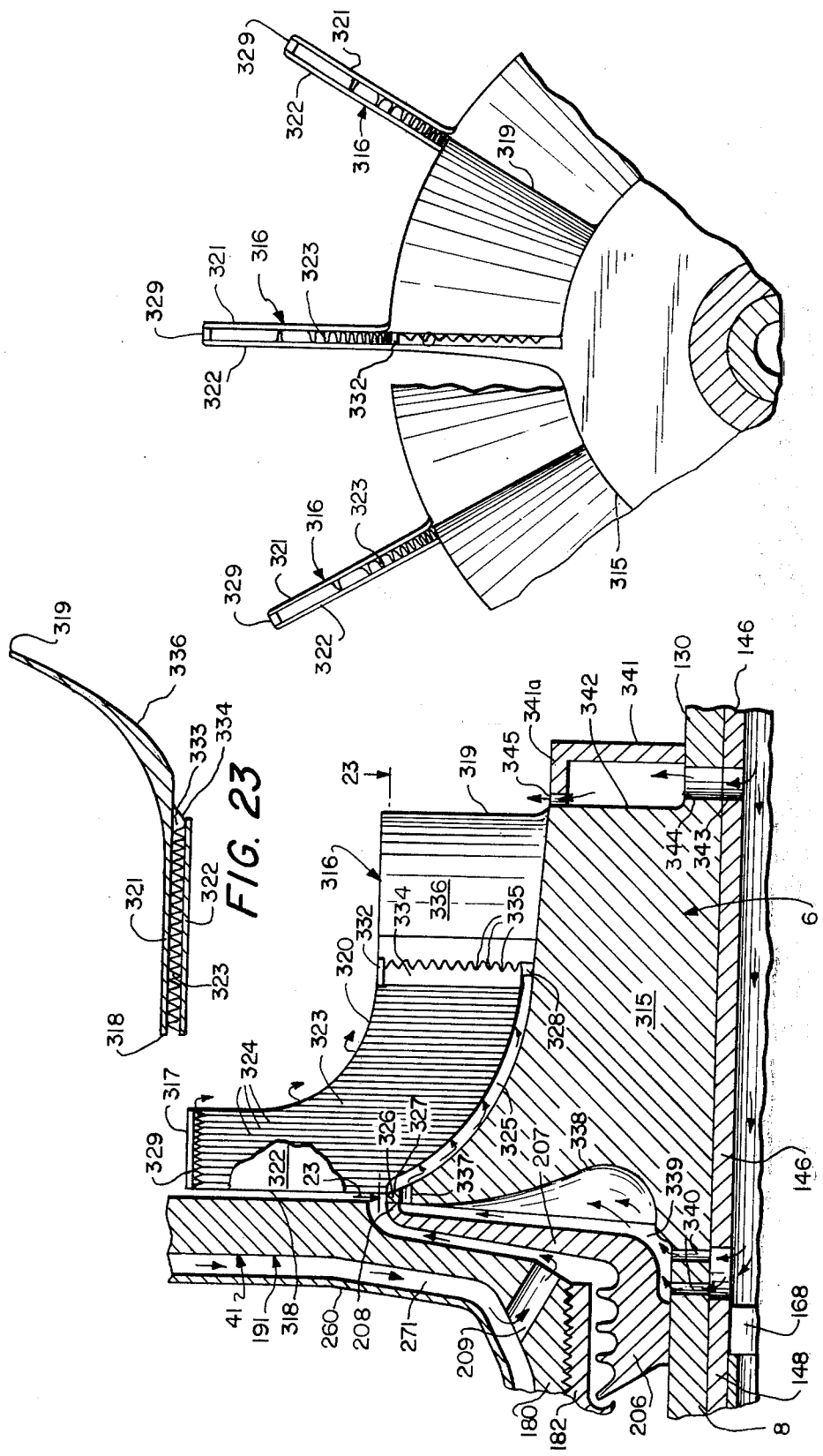

3,939,904

ROTARY DISC REGENERATOR

RELATED APPLICATION

This application is a division of my copending application Ser. No. 300,774, filed Oct. 25, 1972, now Pat. No. 3,818,696, granted June 25, 1974.

BACKGROUND OF THE INVENTION

It has long been recognized that the inherent advantages of the turbine engine, particularly its inherent clean burning characteristics and its high power-to-volume ratio, make the tubine engine a desirable alternative to the reciprocating piston engine for many applications. However, the reciprocating piston engine having been more or less universally adopted, the automotive and other industries have very large investments in engine production facilities, and the design of automobiles and other products is predicated on the reciprocating piston engine, so that commercial interest in turbine engines has been inhibited. Recent anti-pollution requirements have increased the interest in all alternatives to the reciprocating piston engine, and new advances in turbine engines have been made. To date, however, no turbine engine has been devised which is truly satisfactory for automotive and like applications.

Failure of prior-art workers to provide such an engine has resulted from a number of difficulties. One problem has been that no regenerator structure has heretofore been available which would be economically feasible for low cost applications such, for example, as automotive applications. Particular difficulty has been encountered in attempting to provide effective yet economical means for sealing the regenerator against escape of the high pressure cool air to the exhaust. Another related problem has been that the seals and related structures proposed for rotary disc regenerators have been of such nature that it has not been practical to employ a relatively inexpensive sheet metal matrix as the heat exchanger for the regenerator.

OBJECTS OF THE INVENTION

A general object of the invention is to devise a rotary disc regenerator which is suitable for relatively low cost, higher efficiency regenerative gas turbine engines.

Another object is to provide such a regenerator having markedly improved seals which are effective to minimize air-to-exhaust leakage and which are useful even with inexpensive sheet metal heat exchange matrices.

A further object is to provide an improved heat exchanger configuration in regenerative gas turbine engines, characterized by improved regenerator effectiveness and greater economy of construction.

Yet another object is to provide, in a gas turbine engine, an improved mounting arrangement for disc regenerators.

A still further object is to provide an efficient, low cost rotary disc type regenerator which can be mounted to be concentric with the turbine axis in a gas turbine engine.

Another object is to devise, in such a regenerator, improved and easily manufactured flow means for confining the high pressure air supplied to the regenerator.

SUMMARY OF THE INVENTION

Regenerators according to the invention embody a rotary disc comprising a heat exchange matrix which has normally flat major faces lying in planes transverse to the axis of rotation of the disc, the matrix being of any type constructed to accommodate gas flow therethrough from major face to major face in directions parallel to the axis of rotation but advantageously being in the form of a closed spiral made by winding two thin metal sheets, one of which is corrugated and the other of which is uncorrugated, in such fashion that the convolutions of the spiral are in contact with each other and the uncorrugated sheet lies in line contact with the peaks of the corrugations of the corrugated sheet. Save at its inner and outer peripheries, the matrix itself has no means for laterally confining the gas flow or for maintaining cool high pressure air separate from the hot exhaust gases. These objectives are accomplished by stationary seal devices each of which is disposed adjacent one major fact of the matrix and constructed to enclose a gas flow space, the seal devices comprising bimetal means extending at least generally along a diameter of the disc in close proximity to but out of contact with the adjacent matrix face, the bimetal means being operative to warp the seal device in conformity to the adjacent face of the matrix as the matrix warps in response to temperature changes, the effect of the bimetal means thus being to preserve the close proximity of the seal device to the matrix while avoiding rubbing contact between the seal device and the matrix. Typically, there are four seal devices arranged in pairs opposed across the heat exchange matrix, so that each opposed pair of seal devices defines, in effect, an air flow confining passage through the matrix, the area of the matrix not covered by those passages being employed for passage of engine exhaust gases in the opposite direction from the air flow. Advantageously, each seal device comprises two bimetal bars each extending along a different diameter of the disc, the inner ends of the bars being secured to a stationary member located at the center or hub of the disc, the outer ends of the bars each carrying a roller engaged with the disc to stabilize the position of the seal device relative to the matrix face. The two bars are outwardly divergent, and the seal device includes a tubular bellows having one end fixed to a rigid support spaced from the matrix and the other end fixed to a structure including the two bimetal bars, the bellows communicating with an air inlet opening in the rigid support and being effective to conduct air to the space between the two bimetal bars and thus to the fact of the heat exchange matrix.

In order that the manner in which the foregoing and other objects are achieved according to the invention can be understood in detail, one particularly advantageous embodiment thereof will be disclosed with reference to the accompanying drawings, which form a part of the original disclosure hereof, and wherein:

FIG. 18 is a fragmentary longitudinal sectional view taken at the location of one of the cooled nozzle vanes of the drive turbine of the engine;

FIG. 19 is an end elevational view, with parts broken away for clarity, of the nozzle vane of FIG. 18;

FIG. 20 is a sectional view taken generally on line 20—20, FIG. 18;

FIG. 21 is a fragmentary end elevational view of the rotor of the drive turbine, with parts broken away for clarity;

FIG. 22 is a fragmentary longitudinal sectional view of the drive turbine rotor;

FIG. 23 is a transverse sectional view of one of the rotor blades of the drive turbine;

Figure 28:
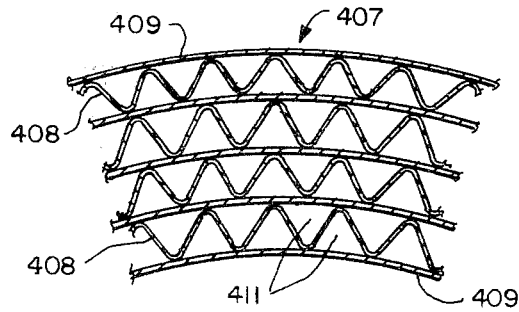
Figure 3:
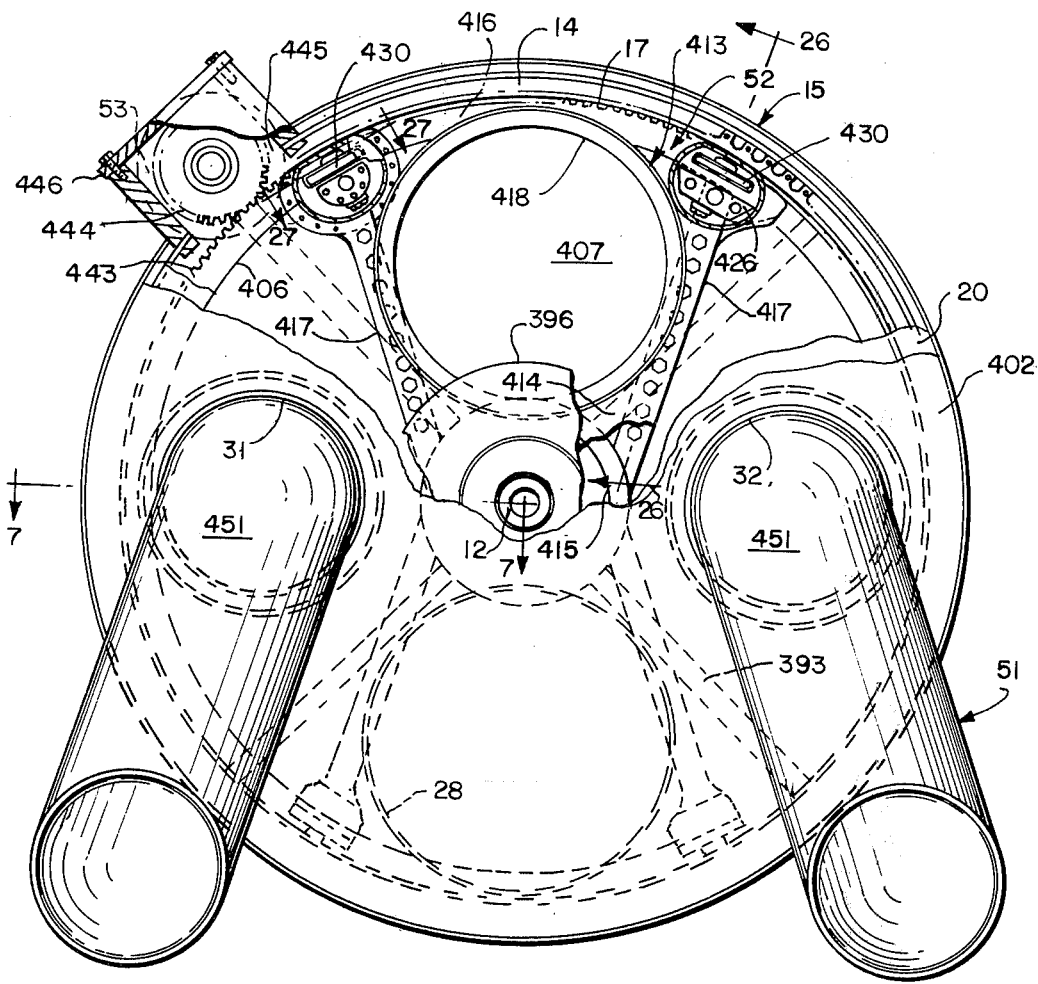
FIG. 3 is an end elevational view taken at the opposite end of the engine, with the gear box removed and parts broken away for clarity.
Figure 12:
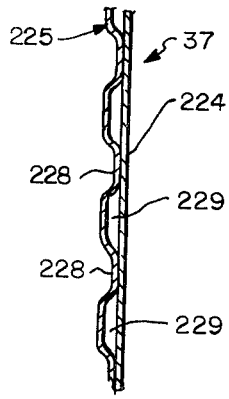
FIGS. 11-15 are fragmentary sectional views taken generally on lines 11—11, 12—12, 13—13, 14—14, and 15—15, respectively, FIG. 5.
Figure 27:
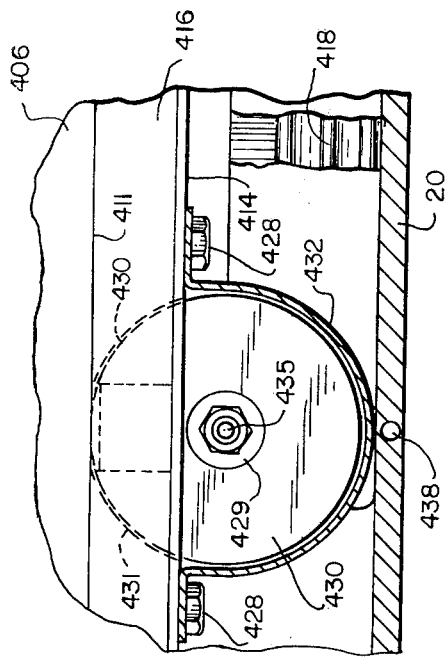
Figure 26:
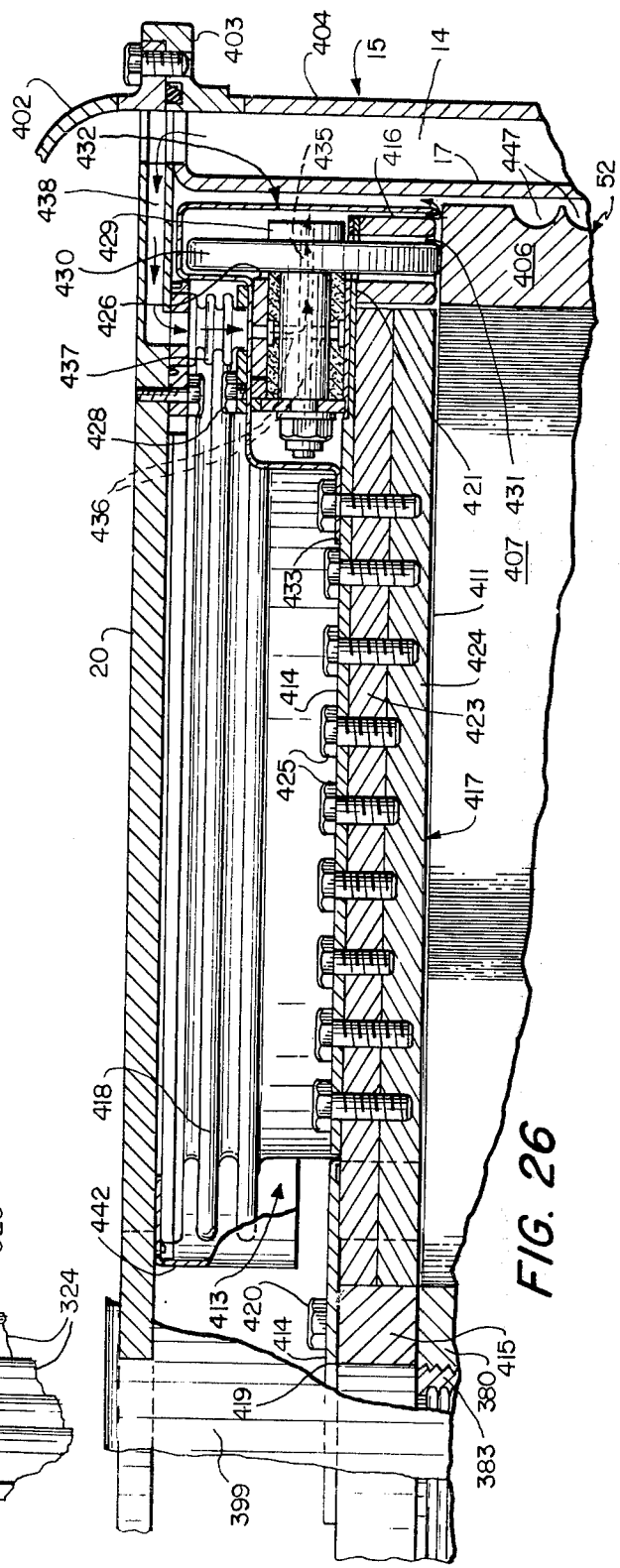

FIGS. 26 and 27 are fragmentary sectional views taken generally on lines 26—26 and 27—27, FIG. 3, respectively; and FIG. 28 is a fragmentary transverse sectional view of a portion of the heat exchanger matrix.

DETAILED DESCRIPTION

Overall Combination

Figure 1:
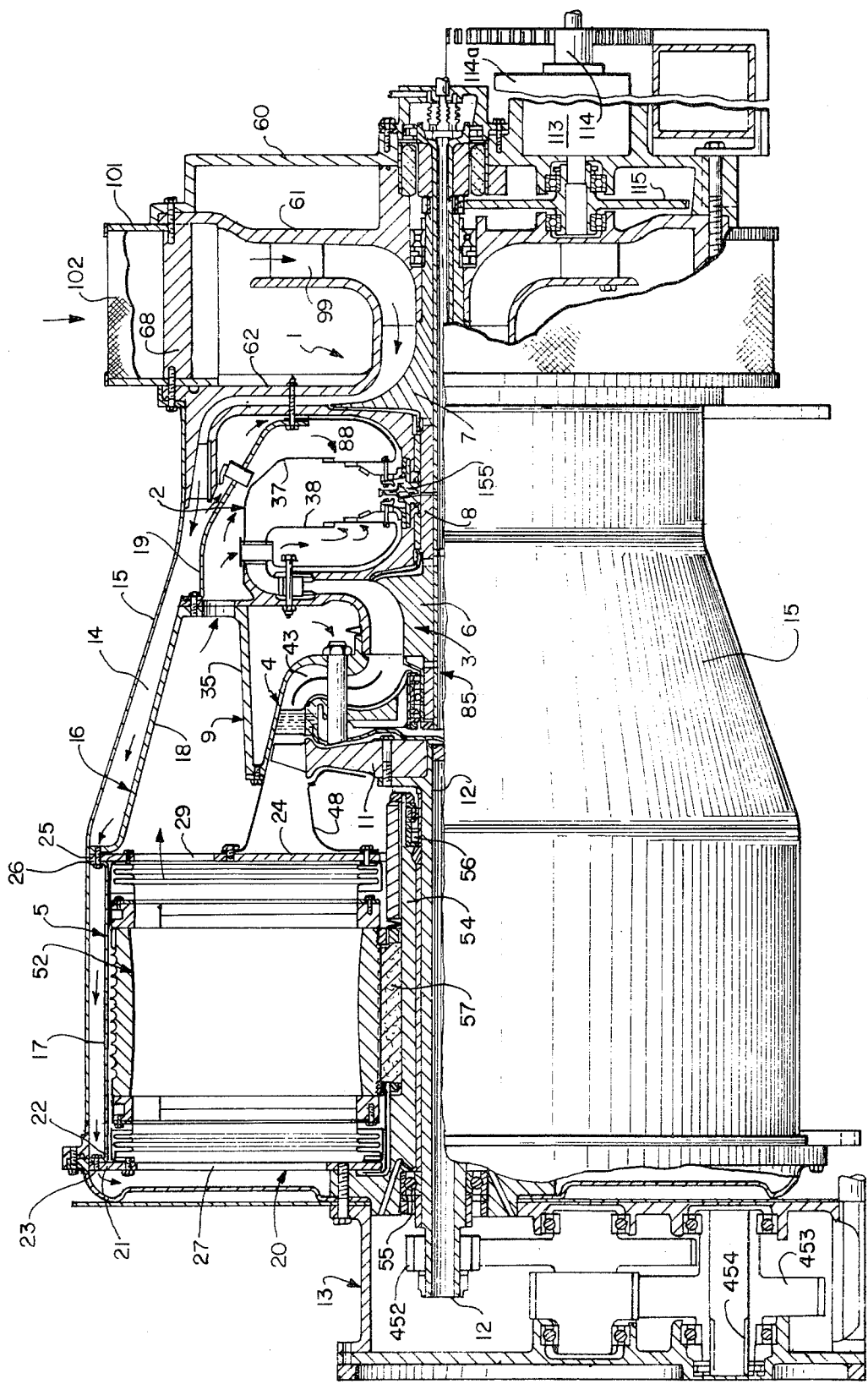
FIG. 1 is a view, partially in longitudinal section and partially in side elevation, of a turbine engine according to one embodiment of the invention.

Referring to FIG. 1, the engine disclosed comprises a centrifugal compressor 1, an at least generally radial flow combustor 2, an air-cooled radial inflow drive turbine 3, a free power turbine 4, and a rotary heat exchanger 5, all of the components just recited being concentric with the longitudinal axis of the engine, compressor 1 being located at one end of the engine, heat exchanger 5 being located at the other end, and the combustor 2 surrounding the space between compressor 1 and drive turbine 3. The rotor 6 of turbine 3 is connected to rotor 7 of compressor 1 by a tubular shaft 8. The rotor 11 of power turbine 4 is secured to a shaft 12 which is coaxial with shaft 8 and projects through the center of heat exchanger 5. Shaft 12 is the output power shaft, being connected to the input of a reduction gear box 13. Compressor 1 is a radial outflow centrifugal compressor operated at a pressure ratio of, e.g., 6:11-8:1, and the air discharged therefrom is conducted to heat exchanger 5 via a tubular flow passage 14 defined by tubular outer casing 15 and a tubular wall, indicated generally at 16, spaced inwardly from casing 15 and comprising members 17–19.

Outboard of heat exchanger 5 is a circular flat plate 20 having circumferentially spaced outwardly projecting ears 21 secured rigidly to like ears 22 on the end of wall member 16, as by screws 23. At the other side of the heat exchanger, a circular flat plate 24 has circumferentially spaced outwardly projecting ears 25 disposed between and rigidly secured to like ears 26 on wall member 17 and 18. Plate 20 has two diametrically spaced air inlet openings 27 and 28. Plate 24 has two diametrically spaced air outlet openings 29 and 30 axially aligned with openings 27, 28, respectively. In locations angularly spaced 90° from the locations of air inlet openings 27 and 28, plate 20 has two diametrically spaced exhaust gas outlet openings 31 and 32. Similarly, plate 24 has two diametrically spaced exhaust gas inlet openings 33 and 34 axially aligned with openings 31 and 32, respectively.

A tubular wall, indicated generally at 35, and forming an integral part of a casting 9, is spaced inwardly from wall member 18 and cooperates therewith to define a tubular passage portion 36 communicating between air outlet openings 29, 30 of the heat exchanger, on the one hand, and the space within wall 19, on the other hand, the latter space being occupied by combustor 2.

Combustor 2 includes an outer wall member 37 and an inner wall member 38 which cooperate to define the combustion chamber and are of such shape as to define a circular gas discharge opening 39 which is disposed to discharge the combustion gases directly into the nozzle blade passage 40 of drive turbine 3, i.e., the space between an outer extension of back shroud member 41 of drive turbine 3 and an outer extension of outer shroud member 42 of the drive turbine. Drive turbine 3 is a radial inflow, cooled turbine which discharges into a flow passage 43 of S-shaped radial cross section defined by an annular member 44, which projects inwardly from wall member 35, and a member 45. The outer portion of passage 43 opens axially into the power turbine nozzle vane passage 46 defined by members 35 and 45.

Power turbine 4 is of the axial type and discharges into an annular flow diffusing passage 47, defined by members 35 and 35a and a cup-shaped inner shell 48. Communicating with passage portion 36, the air outlet openings 29, 30 are located outside of wall 35. Exhaust gas inlet openings 27 and 28 on the other hand, are located in the portion of plate 24 which extends inwardly of wall 35 and therefore communicate with the generally tubular passage 47. Accordingly, the exhaust gases discharged by power turbine 4 are supplied to heat exchanger 5 via passage 47 and openings 27, 28. Passing through the heat exchanger as later described, the exhaust gases are conducted by tubes 49, 50 to the exhaust system 51 and thence to a point of discharge.

Heat exchanger 5 includes a rotary heat exchange disc, indicated generally at 52, driven by an electric motor 53. Heat exchange disc 52 is located between plates 20 and 24. A tubular support member 54 extends through central openings in plates 20, 24 and, as later described, is secured rigidly to plate 20. Power turbine shaft 12 extends freely through member 54, projecting axially therebeyond, and is supported on member 54 by anti-friction bearings 55 and 56. Heat exchange disc 52 is rotatably supported on member 54 by a carbon bearing 57.

STRUCTURE AT COMPRESSOR END OF THE ENGINE

Figure 4:
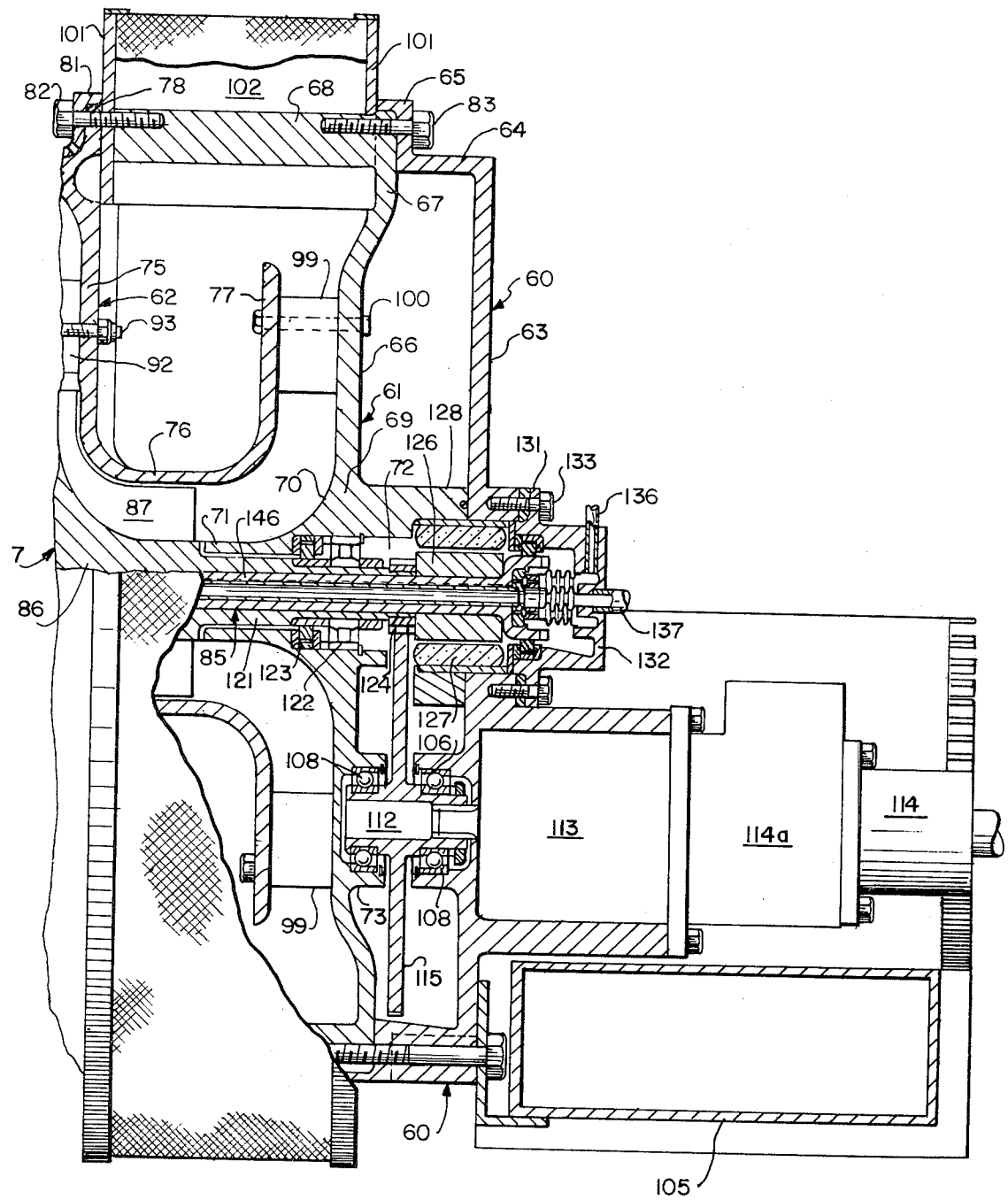
FIG. 4 is a fragmentary longitudinal sectional view of that portion of the engine of FIG. 1 extending from the right-hand (as viewed in FIG. 1) end of the engine through the compressor rotor.

At the compressor, or cold, end of the engine, the structure includes an end member 60, a member 61 which serves both as a support member and an air inflow shroud member, and the outer shroud member 62 of compressor 1. Member 60 includes a flat circular end wall 63, a short cylindrical outer wall 64, and an outwardly projecting transverse annular mounting flange 65. Member 61 is an integral casting and comprises a flat annular intermediate portion 66, a flat transverse annular outer portion 67 which is offset from portion 66 toward member 60 and has the same outer diameter as flange 65, a plurality of spacer portions 68 which extend from portion 67 in a direction which, in the completed structure, is longitudinal of the engine and toward the heat exchanger 5, and a hub portion indicated generally at 69. Hub portion 69 includes an annular portion 70 joined to the inner periphery of intermediate portion 66 and curving smoothly to terminate in a right cylindrical nose portion 71 which is concentric with the axis of shaft 8 and projects toward compressor 1. Nose portion 71 is tubular and the bore therethrough opens into a larger diameter right cylindrical recess 72 at the opposite side of the hub portion 69. At its side opposite compressor 1, intermediate portion 66 is provided with two integrally formed tubular outwardly projecting bearing supports 73, one of which is seen at 73, FIG. 4. the two being angularly spaced by 45° about the axis of the engine.

Outer shroud member 62 of compressor 1 is an integral casting comprising a flat transverse annular portion 75, a cylindrical tubular inner portion 76 having an inner diameter substantially greater than the outer diameter of nose portion 72 of member 61 and which extends axially from portion 75 toward member 61, a second flat transverse annular portion 77 which extends outwardly from the end of portion 76, and an outer tubular portion 79 which extends from portion 75 toward heat exchanger 5. Portion 79 has a right cylindrical outer surface directly embraced by the corresponding end portion 80 of outer casing 15. Portion 75 projects outwardly beyond the outer surface of tubular portion 79 so that there is an exposed peripheral flange portion 78 of a diameter such that the corresponding ends of spacers 68 engage flange 78. A sleeve 81 embraces flange 78 and the adjacent part of tubular portion 79, the end of sleeve 81 being welded to the end of portion 80 of casing 15. Member 61 is secured rigidly to shroud member 62 by a plurality of screws 82 which extend through sleeve 81 and flange 78 and are each engaged in a threaded bore in the end of a different one of spacers 68.

Member 60 is similarly secured to member 61 by screws 83 each extending through flange 65 into a threaded bore in outer portion 67 of member 61.

Rotor 7 of compressor 1 embraces a tubular bolt shaft 85, later described, and is concentric with the longitudinal axis of the engine, defined by the bolt shaft. The rotor includes a hub 86 and blades 87 and occupies an axial position on bolt shaft 85 such that the curved outer edges of blades 87 extend along lines closely adjacent to the adjacent inner surface of shroud member 62. Back shroud member 88 of compressor 1 comprises a generally flat transverse annular portion 89, an inner hub 90 which also acts as a bearing support, and an outer tubular portion 91. Portion 75 of shroud member 62 and portion 89 of shroud member 88 are spaced apart axially of the engine and are mutually parallel, defining an outwardly directed radial flow channel leading to the space between concentric shroud portions 79 and 91. A plurality of channel diffusers 92 are engaged between shroud portions 75 and 89. The combination of shroud portions 75 and 89 and diffusers 92 is rigidly clamped by a plurality of axially extending bolts 93 which also serve to secure the inwardly projecting annular end portion 94 of wall member 19 and the outer peripheral portion 95 of a sheet metal air flow confining wall member 96, later described. Spaced concentrically inwardly from tubular portion 79 of shroud member 62, the outer tubular portion 91 of shroud member 88 carries a plurality of axial diffuser vanes 98 which are thus supported in the compressor discharge annulus defined by shroud portions 75 and 88. Thus, directionally controlled by vanes 98, the air from compressor 1 is discharged directly into the outer flow passage 14.

Portion 77 of shroud member 62 and portion 66 of member 61 are mutually parallel and spaced apart axially, a plurality of adjustable guide vanes 99 being disposed between portions 77 and 66 and secured, e.g., by dowel bolts 100. With the outer diameter of nose portion 72 of member 16 equal to the outer diameter of the adjacent end of hub 86 of compressor rotor 7, member 61 cooperates with portions 77 and 76 of shroud member 62 to define the inlet air flow channel for compressor 1. That channel opens outwardly directly into the space between portion 67 of member 61 and portion 75 of shroud member 62. Two annular support plates 101 are provided, each secured rigidly to and extending outwardly from a different one of flange 65 and shroud portion 78. A plurality of conventional swirl tube type dynamic air cleaner assemblies 102 are arranged between plates 101 in an annular series and are secured to plates 101, each air cleaner 102 being centered between a different pair of the spacers 68. Air cleaners 102 are so constructed and arranged as to pass air from the space surrounding the series of air cleaners inwardly into the space between portions 67 and 75 and, therefore, to the inlet air flow channel for compressor 1. Particulate matter removed from the air by cleaners 102 is delivered to a dust manifold (not shown) under reduced pressure induced, e.g., from engine exhaust gas flow.

Figure 2:
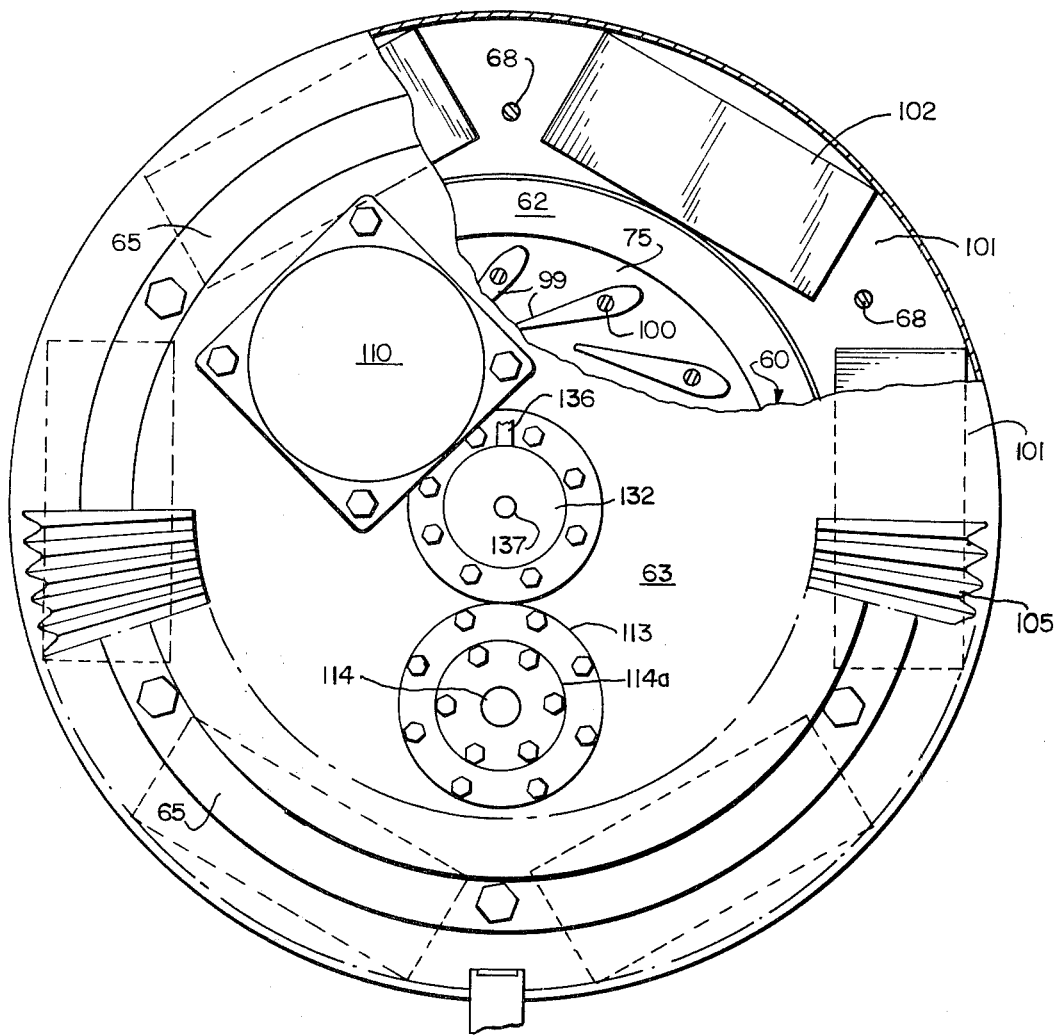
FIG. 2 is an end elevational view taken at the cold end of the engine of FIG. 1.

An oil tank 105 of semi-annular configuration is secured to member 60. The two bearing supports 73 of member 61 are axially aligned respectively with complementary bearing supports 106 on wall 63 of member 60. Each support 73, 106 accommodates an antifriction bearing 108. The bearings accommodated by the two pairs of supports 73, 106, respectively support the shafts of a conventional electric starter motor-generator 110 and an oil pump and fuel pump unit indicated generally at 107, FIGS. 2 and 4. The drive means for both the starter motor-generator and the pump unit being identical, only the drive for the pump unit, seen in FIG. 4, will be described. The hub of a gear 115 is journalled in the aligned bearings 108 and fixed to the drive shaft 112 of the pump unit. Gear 115, and the similar gear (not shown) for the motor-generator, are meshed with pinion 124, later described. Shaft 112 drives conventional oil pump 113, conventional fuel pump 114, and a conventional pneumatic-mechanical fuel control device 114a.

SHAFT ASSEMBLY AND FUEL FEED

The combination of drive turbine rotor 6, tubular shaft 8, and compressor rotor 7 is secured together axially by bolt shaft 85. Shaft 8 is provided with splines 117, 118 at its respective ends, splines 117 being mated with face splines 119 on the adjacent end of rotor 6 and splines 118 being mated with face splines 120 on the adjacent end of rotor 7 so that the combination of rotors 6 and 7 and shaft 8 rotates as if integral. Compressor rotor 7 includes a tubular extension 121 of such length as to extend through and project beyond hub portion 69 of member 61. Supported in recess 72 of hub portion 69 are a roller bearing 122 and a seal 123 both of which engage the cylindrical outer surface of extension 122. Immediately beyond hub portion 69, the extension has secured thereto a pinion 124 which is meshed with gear 115.

Bolt shaft 85 extends for a short distance beyond the tip of extension 121 and the head 125 of the shaft is outwardly enlarged. Embracing bolt shaft 85 between pinion 124 and head 125 is the rotor 126 of a conventional permanent magnet type generator employed to generate a control signal dependent upon engine speed and also useful, if desired, as the primary generator. Rotor 126 coacts with a stator or field winding 127 carried partly by a cylindrical extension 128 which is integral with hub portion 69 of member 61 and partly by the wall of a central opening in wall 63 of member 60.

At its opposite end, bolt shaft 85 is threaded and carries a nut 129 engaged with the tip of a tubular extension 130 on drive turbine rotor 6. Accordingly, nut 129 cooperates with head 125 to apply an axial clamping force to the combination of members 6, 8 and 7.

On its outer side, wall 63 is provided with a short cylindrical hub, the inner end of which defines the central opening of the wall and an outer portion of which is of larger diameter to accommodate the outer flange 131 of a cup-shaped cover member 132 secured rigidly to member 60, as by screws 133. At its inner face, the end wall of member 132 has outer and inner cylindrical tubular projections 134 and 135, respectively, which are mutually concentric and concentric with the axis of bolt shaft 85. A start/idle fuel supply conduit 136 communicates with the annulus between projections 134, 135 and a run fuel supply conduit 137 communicates with the space within projection 135. An outer annular resilient metal bellows 138 has one of its ends secured in fluid-tight relation, as by brazing or gluing, to the tip of projection 134. An inner bellows 139 is similarly secured to the tip of projection 135. The remaining ends of bellows 138, 139 are secured to a carbon ring 140, FIG. 8, which bears in rubbing seal fashion against a hardened steel ring 141 fixed to the head of bolt shaft 85. The mating faces of rings 140 and 141 have opposed manifold grooves 142 and 143, respectively. Ring 140 has a plurality of through bores 144 opening into groove 142. Similarly, ring 141 has a plurality of through bores 145 opening into groove 143.

Figure 8:
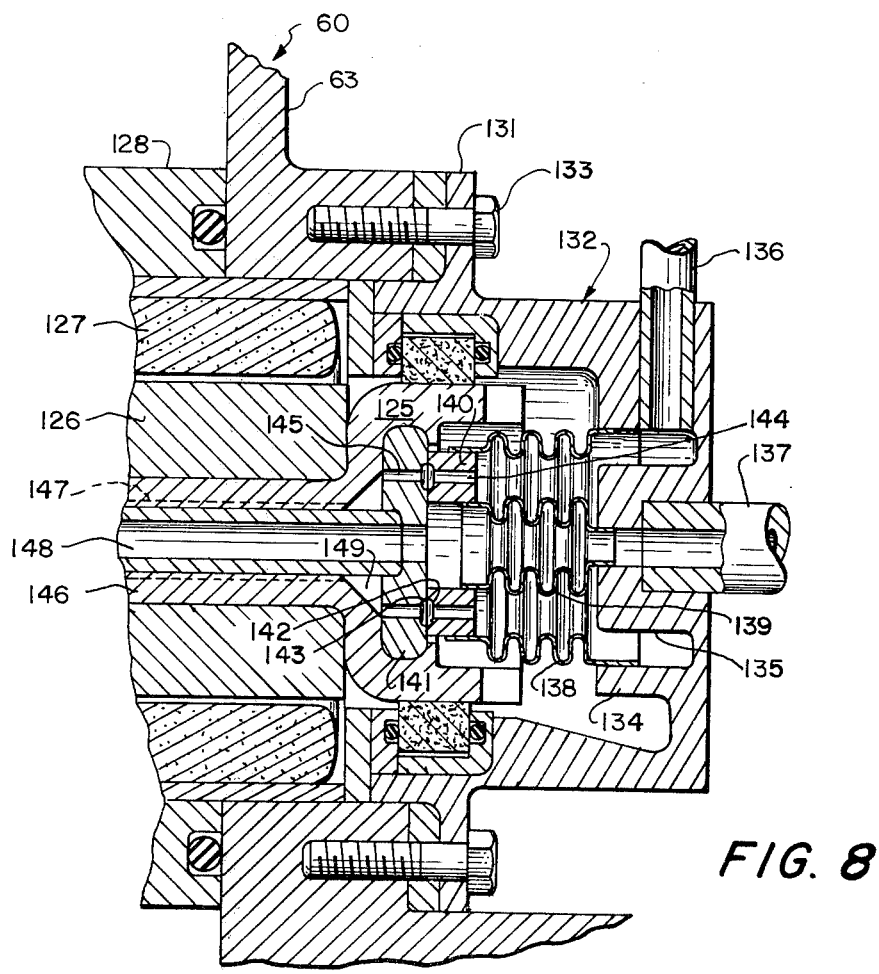
FIG. 8 is an enlarged fragmentary longitudinal sectional view illustrating the structure via which fuel is supplied to the engine.
Figure 9:
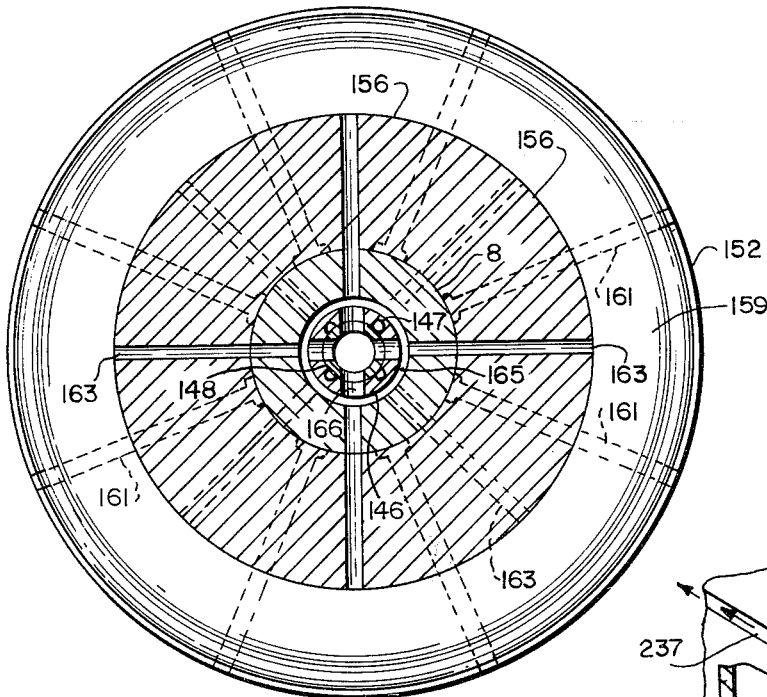
FIG. 9 is a fragmentary transverse cross-sectional view taken generally on line 9—9, FIG. 5.
Figure 10:
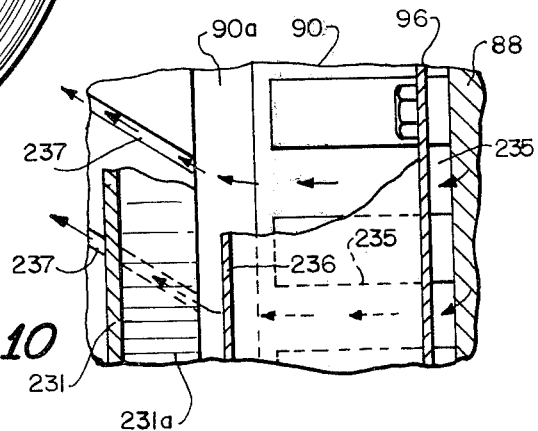
FIG. 10 is a fragmentary elevational view, with parts removed and broken away for clarity, showing a portion of the back shroud of the compressor.

As shown in FIG. 9, bolt shaft 85 comprises a main tubular shaft member 146, which has a plurality of axially extending inner grooves 147, and a relatively thin-walled filler tube 148 which extends throughout the lengths of grooves 147 and covers the same. At head 125, the inner wall of shaft member 146 tapers sharply outwardly to embrace ring 141, and tube 148 projects through the central opening of ring 141 and is sealed in fluid-tight fashion thereto. There is thus an annular space 149, FIG. 8, into which the bores 145 of ring 141 and the grooves 147 of member 146 open. Accordingly, start/idle fuel supplied by conduit 136 flows into the grooves 147, and run fuel supplied by conduit 137 flows into the interior of tube 148.

Supply of start/idle fuel via conduit 136 is controlled by an on-off valve (not shown) forming part of fuel control device 114a, the on-off valve being conventionally operated to supply start/idle fuel when the shaft assembly attains, e.g., about 15% of full rotational speed. Run fuel supplied via conduit 137 is controlled by conventional modulating and limiting control valves (not shown) in response to signals from generator 126, 127.

COMBUSTOR

Figure 16:
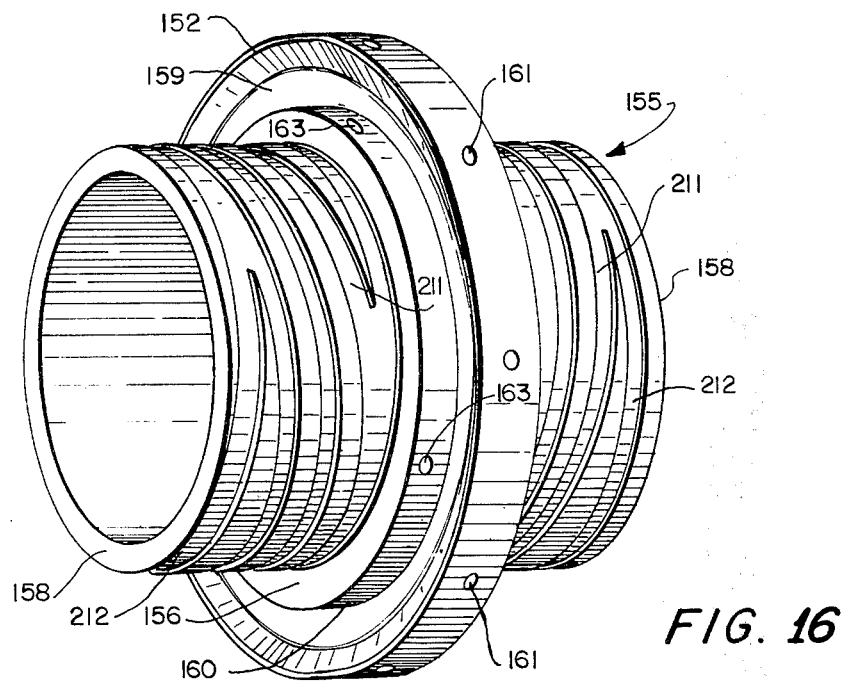
FIG. 16 is a perspective view of the fuel slinger of the engine of FIG. 1.

Shaft 8 is so located on bolt shaft 85 that, in the completed assembly, shaft 8 is axially centered with respect to the inner peripheral portions of combustor walls 37 and 38. Secured to the central portion of shaft 8, so as to rotate therewith, is a fuel slinger indicated generally at 155, FIGS. 16 and 17. Fuel slinger 155 is an integral metal body having a central through bore which directly embraces shaft 8. The slinger body includes an inner hub portion 156 each face of which is equipped with a right cylindrical tubular axially projecting flange 157, a right cylindrical, tubular, axially projecting seal flange 158 concentric with the through bore and projecting axially therefrom in a location spaced a significant distance outwardly from flanges 157, and an outer peripheral disc portion 159 which is relatively thin as compared to the axial thickness of hub portion 156 and is of such diameter as to extend outwardly between the inner peripheral portions of combustor walls 37, 38. At its outer periphery, disc portion 159 has oppositely projecting tubular flanges 152 which are concentric with the shaft assembly. Since disc portion 159 is relatively thin and is axially centered on hub portion 156, hub portion 156 has right cylindrical outer peripheral surfaces 160 each on a different side of disc portion 158. A plurality of radial bores 161, FIGS. 8 and 17, extend completely through disc portion 159 and hub portion 156. Each bore 161 communicates with a different one of a like number of axial grooves 162 in the wall of the central through bore of the slinger body. Hub portion 156 is also provided with a plurality of pairs of outwardly diverging bores 163, each bore 163 of each pair opening outwardly through a different one of the outer surfaces 160 of the hub portion. At their inner ends, bores 163 of each pair join and register with one of a plurality of radial bores 164, FIG. 17, in shaft 8. Bores 164 open inwardly into an annular space 165 defined by a reduced diameter portion of bolt shaft member 146, that member in turn being provided with a plurality of radial bores 166 which are registered with like openings 167 in tube 148 and therefore communicate between the interior of tube 148 and space 165. As shown in FIG. 8, there are typically four bores 166 and eight bores 163, the bores 166 therefore being of larger diameter than are bores 164, and space 165 affording free communication between bores 166 and bores 163. Bores 166 are each located between a different adjacent pair of axial grooves 147. In a location to the left of the slinger (as viewed in FIG. 5), a plug 168 closes the interior of tube 148 against fluid flow.

Hub and bearing support portion 90 of compressor shroud member 88 projects axially toward fuel slinger 155 and is concentric with the spaced outwardly from shaft 8. Portion 90 has an inner wall portion of larger diameter at 170 to accommodate a seal face ring and bearing retainer 171. The adjacent inner wall portion 172 is of smaller diameter to accommodate a bronze damper bearing 173 of plain cylindrical tubular form. The inner wall of portion 90 is completed by a portion 174 of still smaller diameter, that portion surrounding and being spaced only slightly outwardly from shaft 8. Wall portions 172 and 174 are joined by a transverse annular shoulder 175 which faces toward retaining ring 171. Each annular end face of bearing 173 is grooved to accommodate a high temperature silicone O-ring 176, one engaging ring 171 and the other engaging shoulder 175. Portion 90 has an inner annular recess 177 which is concentric with shaft 8 and opens toward the slinger to freely accommodate the corresponding tubular flange 157 of the slinger. Outwardly of recess 177, portion 90 is completed by a tubular element 90a, secured by threads at its end opposite the slinger. Portions 90 and 90a cooperate to define an annular recess 178, coaxial with shaft 8 and opening toward the slinger, to freely accommodate the corresponding seal flange 158 of the slinger. The inner and outer walls of recess 178 are right cylindrical and spaced slightly from the inner and outer surfaces, respectively, of flange 158. Outwardly of recess 178, portion 90 has an annular end face which is provided with a circular groove 179 concentric with shaft 8 and opening toward the corresponding face of slinger portion 156.

Back shroud 41 of compressor drive turbine 3 comprises a hub and bearing support portion 180 which is complementary to portion 90 of compressor shroud 88. Thus, shroud portion 180 includes larger diameter inner wall portion 181, to accommodate seal face ring and bearing retainer 182, an adjacent inner wall portion 183 of smaller diameter, to accommodate a bronze damper bearing 184, and an inner wall portion 185, of still smaller diameter, spaced slightly outwardly from shaft 8. Wall portions 183 and 185 are joined by a transverse annular shoulder 186. Bearing 184 is disposed between retainer 182 and shoulder 186, the end faces of the bearing being suitably grooved to accommodate high temperature silicone O-rings 187. Portion 180 has an inner annular recess 188 which is complementary to recess 177 and accommodates the corresponding tubular flange 157. Outwardly of recess 188, portion 180 is completed by a tubular element 180a secured by threads at its end opposite the slinger. Portions 180 and 180a cooperate to define an annular recess 189 which is complementary to recess 178 and accommodates the corresponding seal flange 158.

The axial position of hub and bearing support portion 90 of compressor shroud member 88 is fixed by the annular series of bolts 93. Similarly, with transverse annular portion 191 of drive turbine shroud member 41 secured rigidly by an annular series of bolts 192 to shroud member 42, and that member being secured to the integral casting 9, which includes wall 18 and is later described, the axial position of hub and bearing support portion 180 of shroud member 41 is fixed. The fuel slinger hub is fixed on shaft 8 and the axial position of shaft 8 in the overall assembly is fixed. Accordingly, the slinger is centered between shroud portions 90 and 180, sith only small clearances between the opposing transverse surfaces of the fuel slinger, on the one hand, and shroud portions 90 and 180, on the other hand.

At each side of the fuel slinger hub, shaft 8 has elongated portions embraced respectively by the bearings 173 and 184. The outer surfaces of these portions of shaft 8 are provided with helical pumping grooves 196 and 197, respectively, FIG. 17. Groove 196 opens into a transverse annular groove 198, at the end remote from slinger 155, and into a transverse annular groove 199 at slinger 155, groove 199 communicating directly with all of the axial grooves 162 in the slinger hub. Groove 197 similarly opens into transverse annular grooves 200 and 201, the latter groove also communicating with all of the grooves 162. Shaft 8 and bolt shaft member 146 are provided with a plurality of sets of aligned radial bores 202, 203, respectively, each set communicating between a different one of bolt shaft grooves 147 and grooves 198. At the other end of shaft 8, that shaft and shaft member 146 are provided with a plurality of sets of radial bores 204, 205, respectively, each such set communicating between a different one of grooves 147 and groove 200. Accordingly, whenever start/idle fuel is supplied via conduit 136, FIG. 8, that fuel is supplied to both grooves 198 and 200. The combination of bearing 173 and ring 171 embraces the portion of shaft 8 which includes grooves 196, 198 and 199 and effectively covers those grooves. Similarly, the combination of bearing 184 and ring 182 embraces the portion of shaft 8 which includes grooves 197, 200 and 201 and effectively covers those grooves. The helical grooves 196 and 197 are oriented to move the fuel from grooves 198 and 200 inwardly to grooves 199 and 201, as the shaft assembly rotates during operation of the engine, and the fuel so moved is supplied via grooves 162 to the radial bores 161 of slinger 155. Rotation of the slinger causes the fuel to be projected outwardly into the combustion chamber as later described. Simultaneously, any fuel supplied to slinger bores 163 is also projected outwardly.

At the end of shaft 8 adjacent drive turbine 3, a labyrinth gas seal 206 embraces shaft 8 and has its fins positioned to cooperate with ring 182. Shroud portion 180 has a shallow annular recess which accommodates a radially elongated web 207 which forms an integral part of seal 206 and has a peripheral lip 208 which engages the outer peripheral portion of drive turbine bine rotor 6, for a purpose later described. Just outwardly of wall portion 181, shroud portion 180 is provided with a plurality of bores 209 which, as later described, supply air to the space between web 207 and shroud portion 180. At the opposite end of shaft 8, a labyrinth air seal 210 is provided between the shaft and ring 171.

The outer surfaces of seal flanges 158 of the fuel slinger are each provided with a helical pumping groove 211, and each groove 211 opens into a transverse annular groove 212 at the outer end of the seal flange. The adjacent outer walls of the recesses 178 and 189 cover the respective grooves 211, 212. Grooves 211 are oriented to cause any fluid therein to flow away from the fuel slinger 155 when the slinger rotates with the shaft assembly during operation of the engine. Accordingly, the seal flanges 158, cooperating with the walls of recesses 178 and 189, serve to oppose and effectively block the flow toward the combustion chamber of any fuel escaping outwardly between the transverse faces of the fuel slinger and shroud portions 180 and 90. Any fuel actually so escaping is diverted by flanges 152 into the path of the air-fuel mixture discharged from preliminary mixing chambers 247 and 273, later described.

Figure 15:
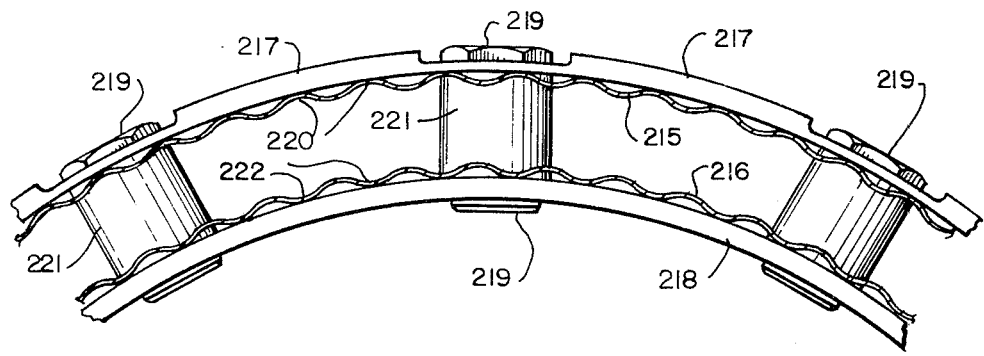

Combustor wal member 37 includes an outer peripheral portion 215 which is tubular and concentric with the shaft assembly. Combustor wall member 38 has a tubular outer peripheral portion 216 which is spaced inwardly from portion 215 and concentric with the shaft assembly. Portions 215 and 216 are secured respectively to outer peripheral portion 217 of drive turbine shroud member 42 and outer peripheral portion 218 of shroud member 41 by an annular series of hollow screws 219. Portion 215 is formed with axially extending corrugations 220, FIG. 15, so as to cooperate with the inner face of shroud portion 217 to form openings via which air can flow from the passage portion between walls 37 and 19 into the annular combustor outlet space between combustor wall portions 215 and 216, thus film-cooling these walls. A spacer sleeve 221 surrounds each screw 219 and has its ends engaged respectively with combustor wall portions 215 and 216 to firmly position the same. Portion 216 has axially extending corrugations 222, FIG. 15, so as to cooperate with the outer face of shroud portion 218 to form openings via which air can flow from the space surrounded by wall portion 216 into the combustor outlet space.

Figure 11:
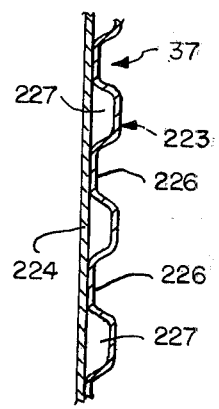

Wall member 37 comprises an outer member 223, an intermediate member 224, and an inner member 225. From peripheral portion 215, outer member 223 extends in tubular fashion toward compressor 1 and then curves inwardly to extend in a flat plane transverse to the shaft assembly. The inner peripheral portion of outer member 223 is deformed in flat hill-and-dale fashion, as shown in FIG. 11, to present a plurality of flat crest portions 226 which are spaced from the body of member 223 toward the interior of the combustor, portions 226 being secured, as by welding, to the flat outer peripheral portion of intermediate member 224. Accordingly, the inner peripheral portion of member 223 and the outer peripheral portion of member 224 cooperate to define an annular series of openings 227 which are in the nature of conduits, in the sense of having adequate length to direct fluid flow, and which communicate between the space between wall member 37 and compressor shroud member 88, on the one hand, and the interior of the combustor, on the other hand. Intermediate member 224 is flat and lies in a plane transverse to the shaft assembly, extending inwardly well beyond the outer periphery of member 225. At its outer periphery, member 225 is deformed in flat hill-and-dale fashion to present a plurality of flat crest portions 228 which are spaced from the plane of member 225 toward member 224. Portions 228 are secured, as by welding, to the adjacent portion of member 224, so that the outer peripheral portion of member 225 and the adjacent portion of member 224 cooperate to define an annular series of openings 229 in the nature of conduits and communicating between the space between members 224 and 225, on the one hand, and the interior of the combustor, on the other hand.

Figures 13, 14:
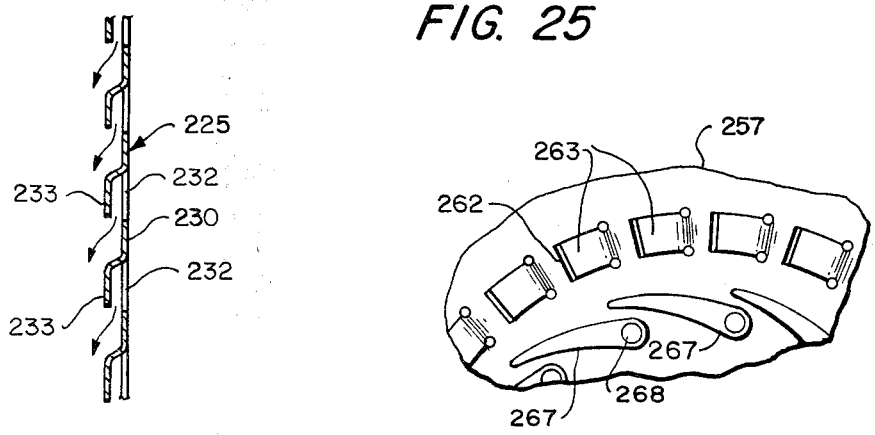

Member 225 includes a frusto-conical intermediate portion 230 which tapers inwardly toward shaft 8 and away from shroud member 88, and is completed by a flat inner peripheral portion 231 which lies in a plane transverse to the shaft assembly, and a tubular portion 231a, which is concentric with the shaft assembly and projects from portion 231 toward member 88. As best seen in FIG. 13, intermediate portion 230 is pierced and bent to provide a plurality of rectangular openings 232 and associated air flow directing fins 233, the latter being on the side of portion 230 facing the interior of the combustor.

Figure 17:
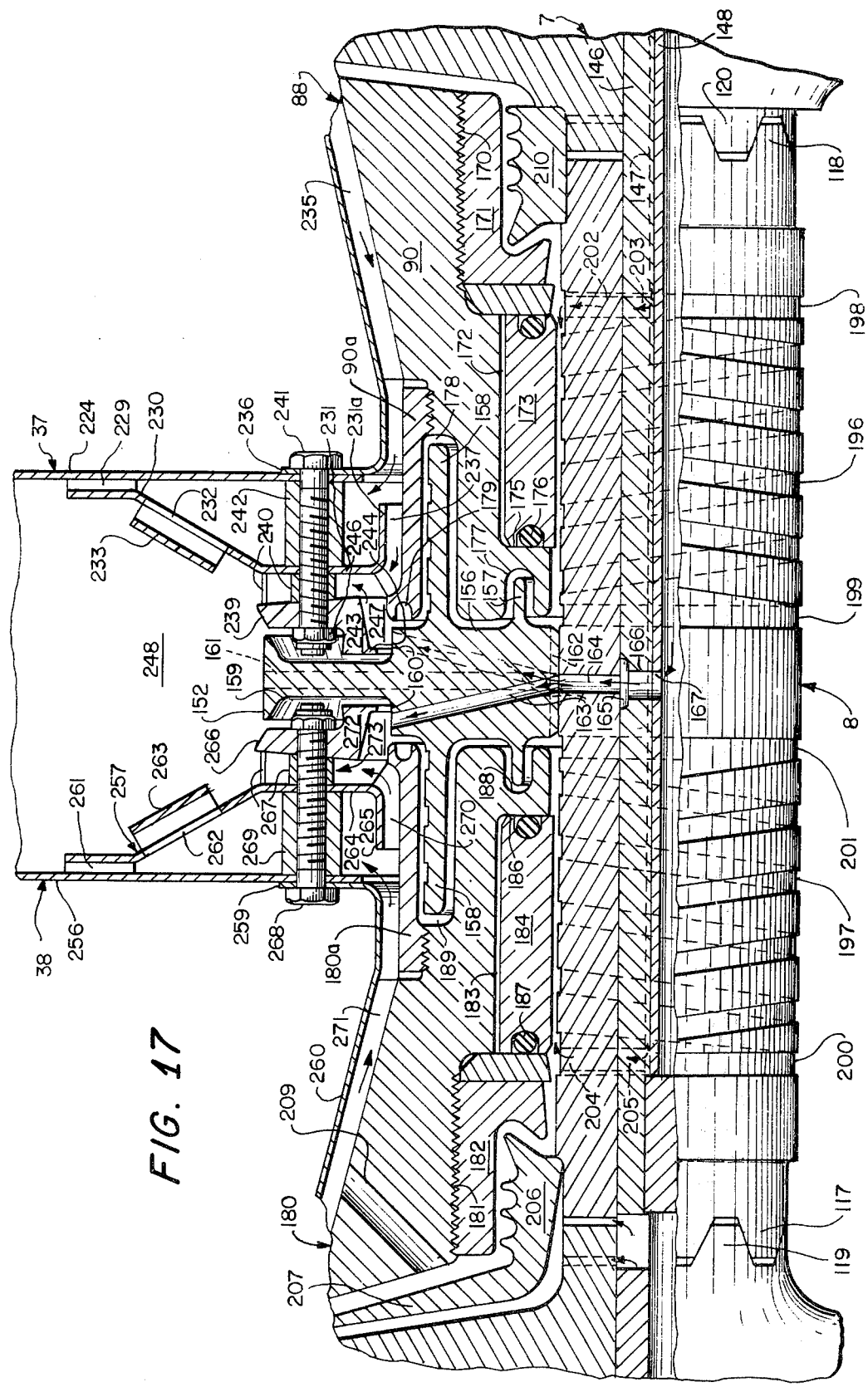
FIG. 17 is an enlarged view, mainly in longitudinal section, of a portion of the structure shown in FIG. 5.

Commencing along a circular line outside of the ring of bolts 93, the face of inner compressor shroud member 88 which is directed toward the combustor is provided with a plurality of grooves 235 which extend first radially inwardly and then axially for a short distance along the outer surface of hub and bearing support portion 90. Wall 96 extends along this face of member 88 from the outer ends of grooves 235 to a position beyond the inner ends of grooves 235 and there curves outwardly to extend as a flat annular transverse flange 236 lying in face-to-face contact with the inner peripheral portion of member 224. As seen in FIG. 17, the outer diameter of portion 90a at the end thereof adjacent the inner ends of grooves 235 is approximately equal to that of a cricle including the bottoms of the grooves 235. Accordingly, this part of portion 90a simply presents a cylindrical surface spaced inwardly from wall member 96. At its other end, portion 90a is outwardly enlarged and provided with a plurality of grooves 237 each having an inlet end axially aligned with a different one of grooves 235 and an outlet end between the inner portion of wall member 225 and the adjacent peripheral surface 160 of the slinger hub. Grooves 237 are of smaller transverse cross-sectional area than grooves 235, and grooves 237 are angularly displaced to direct air in opposition to the direction of rotation of the slinger.

At their outer ends, grooves 235 communicate with the annular space between outer tubular portion 91 of compressor shroud 88 and wall member 19, and that space in turn communicates with passage 14 via the small annular space 238 between the tip of portion 91 and wall 19. Accordingly, cool air discharged from compressor 1 is directly available to grooves 235. Since grooves 235 are covered by wall 96, the grooves act as air flow channels leading to the annular space between the inner end of wall 96 and the smaller diameter, ungrooved portion of element 90a. Part of the air thus supplied travels outwardly, via the space between combustor wall members 224 and 225, to flow through openings 232 into the combustor. The remainder of the air from grooves 235 flows through grooves 237 to be discharged as hereinafter described.

The combination of inner peripheral portion 231 of combustor wall member 225, the inner portion of wall member 224, and of wall member 96 supports a ring 239, FIG. 17, and a plurality of swirl vanes 240. A plurality of bolts 241 are arranged in an annular series and each extends through aligned openings in elements 236, 224, 231 and 239, a spacing sleeve 242 being provided for each bolt, between portion 231 and member 224, to rigidify the structure. Riing 239 is of generally L-shaped radial cross section and is disposed with the annular web 243 projecting toward the adjacent face of disc portion 159 of slinger 155, the shape, dimensions and location of ring 239 being such that web 243 tapers frusto-conically inwardly toward the adjacent face of disc portion 159 and surrounds but is spaced significantly outwardly from the corresponding one of the peripheral surfaces 160 of the slinger hub portion. Web 243 terminates in an annular lip 244 which curves inwardly toward surface 160 and extends along a line closely adjacent to the face of disc portion 159. The main body 245 of ring 239 extends outwardly to terminate adjacent the corresponding flange 152 of slinger disc portion 159, there being adequate radial space between flange 152 and web 243 to accommodate the nuts 246 for bolts 241. There is a substantial annular space between ring 239 and wall portion 231 which is interrupted only by the swirl vanes 240.

The combination of wall portion 231, surface 160, the adjacent face of slinger disc portion 159, and the web 243 of ring 239 defines an annular preliminary mixing chamber 247. For each divergent pair of bores 163, one bore 163 is directed toward the inner face of web 243, at an angle such that fluid discharged from the bore and striking the web is deflected toward wall portion 231. Accordingly, when slinger 155 rotates and fuel is supplied via conduit 137, fuel is continuously projected outwardly from the corresponding bores 163, passing through chamber 247 and impinging forcibly against the inner face of web 243. Concurrently, assuming that combustion has commenced, relatively cool air direct from the compressor is drawn through grooves 235 and 237 into chamber 247 and is uniformly mixed with the fuel, the fuel having been disrupted into droplets by the slinger action and by impingement against web 243. Further atomization of the fuel is accomplished by the opposite swirling air issuing from grooves 237 which constitute air directing vane passages. Accordingly, a uniform mixture of cool air and atomized fuel passes radially outwardly through the space between ring 239 and wall portion 231 into the primary combustion zone 248 of the combustion chamber, with a predetermined spiral or swirl direction imparted by vanes 240. Concurrently, cool air from grooves 235 is also supplied directly to the primary combustion zone 248 (without being mixed with fuel) via openings 232, an initial tangential direction being imparted to this air by louvres 233 in the same direction as the swirl of the fuel/air premixture. Cool air from grooves 235, again without being mixed with fuel, is introduced into the combustion chamber, generally at the outer boundary of primary combustion zone 248, via openings 229, this air being directed radially outwardly and serving mainly to cool the combustion products generated in zone 248. Passage of fuel outwardly between ring 239 and slinger disc portion 159 is impeded because of the close proximity of lip 244 to the slinger disc and of flange 152 to body 245 of ring 239.

The remaining structure of the combustor is generally complementary to that described with reference to wall member 37, and is mainly to confine the secondary air mixing zone when the hot gas is cooled to allowable turbine inlet temperatures. Thus, wall member 38 includes an outer member 255, an intermediate member 256, and an inner member 257. The inner peripheral portion of member 255 is bent in flat hill-and-dale fashion, with the flat crests secured to the outer peripheral portion of member 256 to provide openings 258. Intermediate member 256 is flat and its inner peripheral portion lies in face-to-face engagement with the outwardly projecting flange 259 of air flow confining wall member 260. The outer peripheral portion of inner member 257 is bent in flat hill-and-dale fashion and has its flat crests secured to member 256 to provide openings 261. Member 257 includes a frustoconical intermediate portion having an annular series of rectangular openings 262 each equipped with an air flow directing louvre 263 bent from the sheet metal of member 257. Inner peripheral portion 264 of member 257 is flat and transverse to the shaft assembly, and member 257 is completed by a tubular portion 265 which is concentric with the shaft assembly and projects toward drive turbine 3.

A ring 266 and swirl vanes 267 are secured by bolts 268 to the combination of flange 259, member 256 and portion 264 of member 257, spacer sleeves 269 being provided between member 256 and portion 264 for rigidity. Portion 180 of drive turbine shroud member 41 includes a tubular element 180a which corresponds to element 90a of compressor shroud member 88. Element 180a has a plurality of grooves 270 which are covered by tubular portion 265 of wall member 257. Drive turbine shroud member 41 is provided with a plurality of radial grooves 271 which are covered by wall member 260 and each of which leads toward a different one of grooves 270. The combination of portion 264, web 272 of ring 266, the adjacent face of slinger disc 159, and the corresponding peripheral surface 160 of the slinger hub defines a preliminary mixing chamber 273 which is in all respects complementary to chamber 247. One bore 163 of each divergent pair of slinger bores is directed toward web 272 of ring 266. When run fuel is supplied via conduit 137, rotation of the slinger supplies fuel to chamber 273 and that fuel is mixed with cool primary air from grooves 271, the mixture passing outwardly, through the space between portion 264 of member 257 and the main body of ring 266, into primary combustion zone 248. Vanes 267 impart a swirling motion to this fuel/air mixture in opposition to the spiral motion imparted to the fuel by rotation of the slinger. Concurrently, primary air from grooves 271 passes into the primary combustion zone via openings 262 and also outwardly into the combustion chamber via openings 261. Louvres 263 impart to the air passing through openings 262 an initial tangential direction opposing the spiral or swirling motion resulting from rotation of the slinger. This thoroughly atomized fuel premixed with the relatively cool compressor air minimizes local peak flame temperature and provides a minimum fuel residence time in the hot combustion zone, both of these characteristics minimizing exhaust pollutants, particularly the oxides of nitrogen.

Secondary air, heated by regenerator 5, is supplied to the combustion chamber outwardly of primary combustion zone 248, via openings 227 and 258, and is directed radially outwardly due to the length and radial disposition of those openings. Additional secondary air enters the combustion chamber outwardly of openings 227, 258 via plain openings 249 which have no significant directional effect. Finally, as will be clear from FIGS. 5 and 15, secondary air passes inwardly through the openings afforded by corrugations 220 and 222 to cool turbine nozzle inlet passage walls and then to join the combustion gasses as they pass from the combustor into the inlet of drive turbine 3.

DRIVE TURBINE

Intermediate portion 191 of shroud member 41 is generally flat and extends outwardly to join outer peripheral portion 218 in an essentially right angle bend. Portion 191 is of substantial thickness to allow for grooves 271 and, on the opposite side of portion 191, a circular recesses 275, FIG. 18, which open into passage 40. Shroud member 42 includes an intermediate transverse annular portion 276 from which outer peripheral portion 217 projects and which extends inwardly to join generally tubular inner portion 277. At the juncture of portions 217 and 276, member 42 includes an outwardly projecting transverse annular flange 278 the outer peripheral portion of which lies between an outwardly projecting end flange 279 of wall member 19 and the outer transverse annular wall portion 280 of casting 9. Flange 278 is rigidly secured to flange 279 and wall portion 280 as by screws 281.

Figure 5:
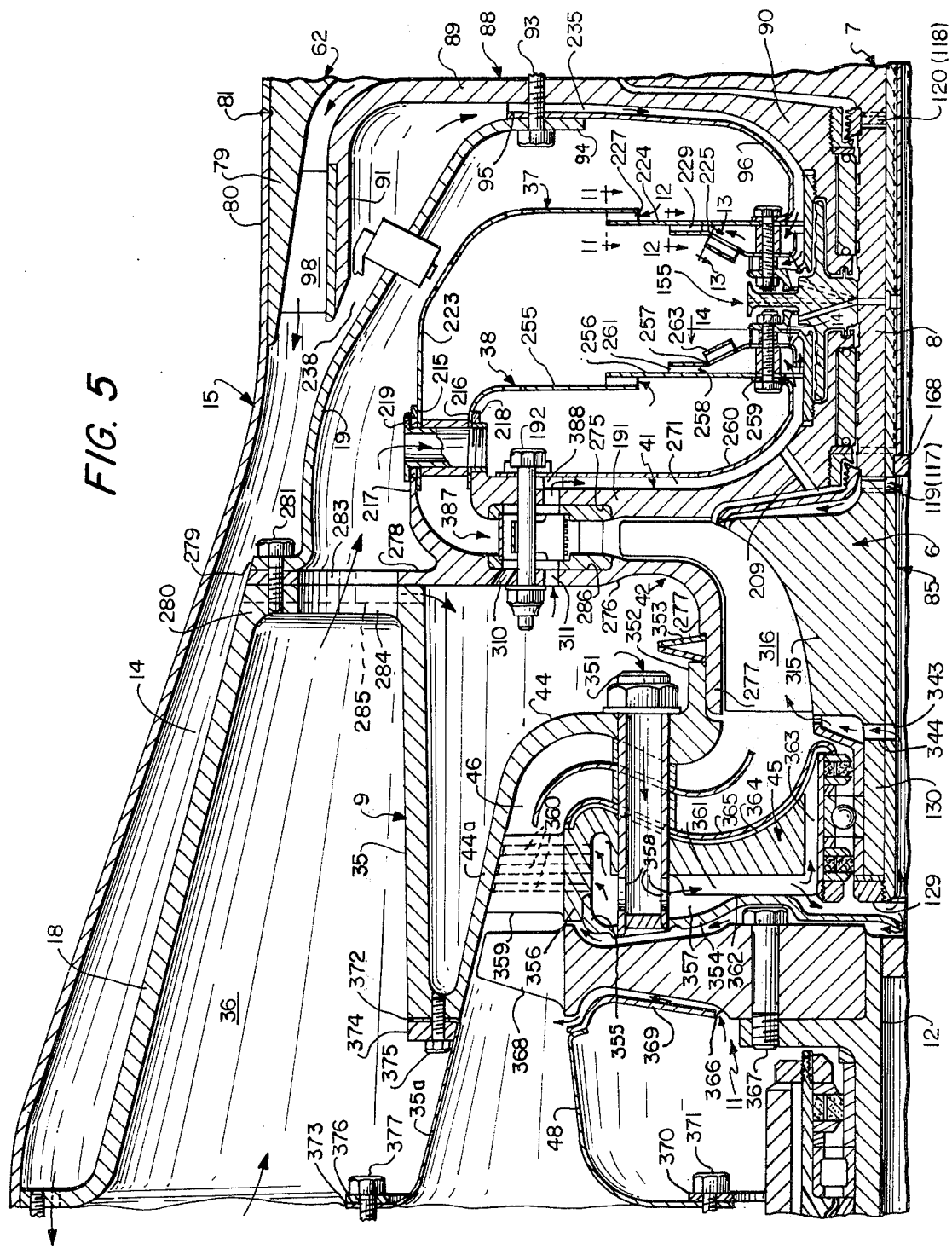
FIG. 5 is a longitudinal sectional view of that portion of the engine extending from the compressor rotor through the power turbine.
Figure 25:
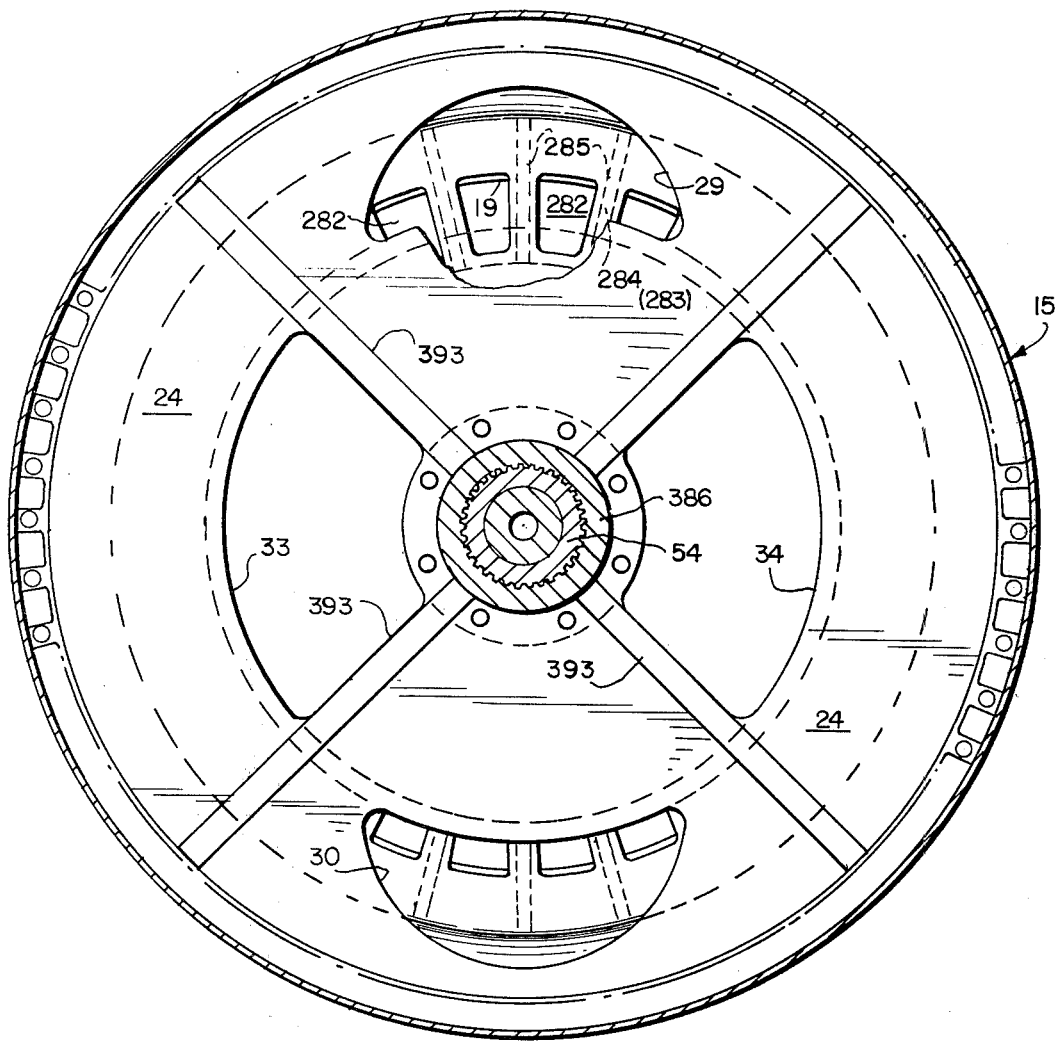
FIG. 25 is a transverse sectional view taken generally on line 25—25, FIG. 6.

As best seen by comparing FIGS. 5 and 25, flange 278 and wall portion 280 are each provided with a plurality of openings 282, FIG. 25, spaced in a circular series with the openings in flange 278 registed with those in wall portion 280, there being a radial portion 283 of flange 278 and a radial portion 284 of wall portion 280 between each adjacent pair of openings 282. Openings 282 communicate between passage portion 36 and the space between wall 19 and combustor 2.

The face of wall portion 280 directed toward combustor 2 is provided with a plurality of radial grooves 285, FIGS. 5 and 25, which open outwardly into passage 14 and inwardly into the space within wall 35 of casting 9. Since the unbroken radial portions 283 of flange 278 cover each groove 285, the grooves 285 function as ducts via which primary air is supplied from passage 14.

Intermediate portion 276 of shroud member 42 has a circular recess 286 which opens into passage 40, recess 286 being opposed across passage 40 from recess 275 of portion 191 of shroud member 42. Opposed recesses 275 and 286 accommodate the nozzle vanes indicated generally at 287, FIG. 5, and shown in detail in FIGS. 18–20. Vanes 287 are identical and, as will be clear from FIG. 20, are angularly disposed in passage 40 to impart to the combustion gases from combustor 2 a direction which is optimum for driving rotor 6.

Nozzle vanes 287 are fabricated from sheet metal and include an outer shell 288 and an inner member 289. Shell 288 is slightly wider than passage 40 and is of rectangular plan, including an elongated flat portion 290, an arcuate end portion 291, and a portion 292 which first slants from portion 291 toward portion 290 and then extends parallel thereto. Portion 292 is shorter than portion 290 and terminates in a straight transverse edge 293 formed with a plurality of transversely spaced prongs 294, FIG. 19, which are bent out of the plane of portion 292 and extend at right angles to portion 290, each prong 294 projecting through a different one of a plurality of openings in portion 290. The prongs 294 are secured rigidly to portion 290 by welds 295, FIG. 20.

Formed from thinner sheet metal than shell 288, member 289 includes an arcuately bent intermediate portion 296 which, as seen in FIG. 18, is narrower than portion 291, a longer portion 297 and a shorter portion 298. Commencing at the tip of portion 298, longer portion 297 is corrugated longitudinally to provide longitudinal channels which are of V-shaped transverse cross section, every other one 299 of the channels being disposed with the V opening toward portion 292 of shell 288, the remaining channels being disposed with the V opening toward portion 290. Throughout most of the length of the corrugations, the crests thereof engage the inner face of shell portion 292 and the valleys of the corrugations engaging the adjacent face of portion 290. Advantageously, the crests and valleys of the corrugations include straight portions brazed to the respective portions 290, 292. As will be clear from FIG. 19, the size and location of prongs 294 are such that no prong is disposed at the mouth of any of the cooling air exit channels 299.

Intermediate portion 296 of member 289 can be of semi-circular cross section, with portions 297, 298 extending tangentially therefrom. At the juncture between portions 296 and 297, member 289 is provided with a plurality of dimples which form outwardly opening grooves 300, FIGS. 19 and 20. Spaced apart transversely of the nozzle vane 287, grooves 300 extend longitudinally of the nozzle vane, placing the space between portions 291 and 296 in communication with the space between portions 292 and 297, so that air can flow from the space between portions 291 and 296 along the inner face of portion 292, through channels 299 and over the corresponding face of the end portion of portion 290. At the juncture between portions 296 and 298, member 289 is similarly provided with dimples which form outwardly opening grooves 301 which, like grooves 300, are spaced apart transversely and extend longitudinally of the vane. Grooves 301 place the space between portions 291 and 296 in communication with the space between portions 298 and 290 so that air can flow from the former space into the latter space and thence through the corresponding channels, escape therefrom being impeded by prongs 294 but the air still escaping to combine with that discharged from channels 299. At this point, it is significant to note that the angular disposition of vanes 287 in passage 40 is such that the hot gases from the combustor 2 impinge directly on shell portion 292 and the corresponding face of the exposed end of portion 290. Considering FIG. 18, the flow of air via grooves 300, 301 is supplemented by air escaping around the ends of narrower portion 296 into both the space between portions 292 and 297 and the space between portions 290 and 298.

The assembly of vanes 287 is completed by a pair of complementary rings 302, 303 which serve as side members for all of the vanes. Ring 302 is accommodated in a circular recess 286 in intermediate portion 276 of shroud member 42, and ring 303 is accommodated in a circular recess 275 in intermediate portion 191 of shroud member 41. For each nozzle vane 287, ring 302 is provided with a recess which opens toward the nozzle vane passage and is of a size and shape to snugly accommodate the corresponding side of the nozzle vane, and ring 303 is similarly provided with a complementary recess to snugly accommodate the other side of the vane. Rings 302, 303 completely fill the recesses in shroud portions 276, 191, so that the inner faces of the rings constitute continuation of the walls of the nozzle vane passage. As will be apparent from comparison of FIGS. 18 and 20, for each nozzle vane 287, each ring 302, 303 has an opening 306 outlined by the inner surfaces of shell portion 291 and adjacent portions 290, 292, opening 306 being completed by an edge 306a, FIG. 20. The nozzle vanes 287 are secured in place by bolts 307, FIG. 18, which extend first through matched openings in member 260 and portion 191 of shroud member 41, thence through opening 306 of ring 302 and through the space within portion 296 of member 289, thence through opening 306 of ring 303, and finally through an opening in portion 276 of shroud member 42. Since there is metal-to-metal contact lengthwise of the bolt between the shroud portions, rings 302, 303, and vane members 288, 289, bolts 307 serve not only to rigidly secure vanes 287 but also to fix shroud portions 191 and 276 in stable positions relative to each other. And bolts 307 also secure the outer peripheral portion of wall member 260.

Portion 191 of shroud member 41 has a circular groove 308, FIG. 18, which opens toward combustor 2, interconnects all of the grooves 271 at the outer ends thereof, and is concentric with the shaft axis. The location of circular groove 308 is such as to be opposite all of the circularly arranged recesses 275. At each recess 275, shroud portion 191 is provided with an opening 309 communicating between opening 306 of the corresponding nozzle vane side member 302, on the one hand, and groove 308, on the other hand.

Portion 276 of shroud member 42 is provided with a plurality of openings 310, arranged in an outer circular series, and a plurality of openings 311, arranged in an inner circular series. Each opening 310 communicates with the outer end portion of opening 306 of a different one of the side members 303, outwardly of the bolt 307. Each opening 311 communicates with the inner end portion of opening 306 of a different one of the side members 303. Accordingly, during operation of the engine, a portion of the air supplied to the space within wall member 35 of casting 9 via grooves 285 is directed through each opening 310 into the space between portions 291 and 296 of the corresponding nozzle vane 287 and, from that space, flows through the nozzle vane via grooves 300, 301 and the channels provided by the corrugated end of portion 297, as hereinbefore described, to cool the nozzle vane. Concurrently, part of the air entering the space within wall member 35 is directed through each opening 311 and flows transversely through the nozzle vane, via the space between portions 297 and 298, and thence through the corresponding opening 309 into groove 308 and then into the grooves 271 to be supplied to preliminary mixing chamber 273. Since the air supplied via openings 311 passes mostly through the inner space bounded by portions 297, 298 and travels at a relatively high flow rate, its temperature is raised by little despite the fact it has traversed the width of the nozzle passage 40.

Drive turbine rotor 6 comprises an integral structure including hub 315 and a plurality of blades 316 which are radial at the tips. The outer surface of hub 315 curves inwardly from a larger diameter, adjacent shroud 41, to a smaller diameter at the exit end of the turbine, the curve being such that the radial space between the hub and the surrounding inner surface of shroud 42 increases progressively toward the exit end. Blades 316 are identical, each having a straight leading edge 317 extending across passage 40, a straight edge 318 parallel to and adjacent the face of shroud portion 191, a straight trailing edge 319, and a curved edge 320 which conforms to and is immediately adjacent the curved inner surface of shroud 42. As seen in FIG. 23, a substantial proportion of blade 316, commencing at edge 318, is flat and lies in a plane including the axis of the rotor, and the remainder of the blade constituting the generally axial exducer portion, is curved away from that plane. The flat or radial portion of each blade is divided into two inner flat mutually parallel portions 321, 322 spaced apart by a small distance to accommodate a thin sheet metal core member 323 which has a plan shape similar to that slightly smaller than that of portions 321, 322. Member 323 is corrugated, with the straight corrugations 324 extending at right angles to the hub axis and being of V-shaped transverse cross section with the crests of the corrugations extending along and being engaged in good heat transfer with the inner faces of the respective flat portions 321, 322. Throughout most of its length, the inner edge of member 323 is spaced outwardly from that portion of the outer surface of the hub between portions 321 and 322 so that a passage 325 is provided with which all of the channels formed by corrugations 324 communicate. At the end of passage 325 at edge 318, the inner edge of member 323 is offset to provide a locator portion 326 engaged with the rim 327 of the larger diameter end of the hub. At the opposite end of passage 325, member 323 has a locator portion 328 which engages the adjacent outer surface of the hub.

Figure 24:
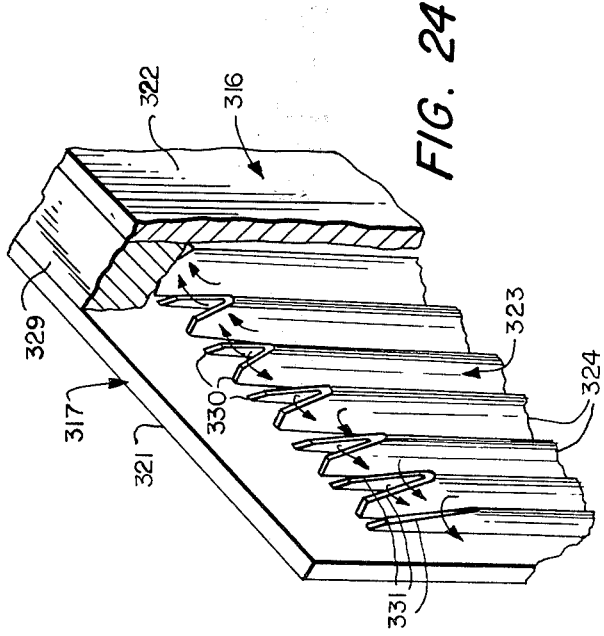
FIG. 24 is a perspective view of the leading edge portion of one of the drive turbine rotor blades, with parts broken away for clarity.

At leading edge 317, a straight piece of wire 329, FIGS. 22 and 24, of rectangular transverse cross-section fills the space between portions 321 and 322 and is secured rigidly thereto in fluid-tight fashion. At this location, member 323 has a straight edge but is bevelled on both sides, as shown in FIG. 24, so that the terminal edge is made up of the small straight surface 330 which lie in a common plane and engage and are secured rigidly to the inner face of wire 329. The bevelled edges 331, FIG. 24, increase in length from the center of leading edge 317 toward each side, so that the outlets they define are correspondingly larger for the corrugations nearer the sides of the blade. Adjacent the curved exducer portion of the blade, a second piece of wire 332 of square cross section is similarly secured between the outer edges of portions 321, 322. Between leading edges 317 and wire 332, the space between the outer edges of portions 321, 322 is open, so that air supplied by passage 325 to the channels formed by corrugations 324 discharges freely outwardly.

In that portion of member 323 extending between wire 332 and hub 315, the sheet metal is deformed to provide only a single corrugation 333, FIG. 23, of substantially larger transverse cross section than the corrugations 324. Corrugation 333 is completed by a wall 334 which slants toward and engages the face of flat portion 321, Wall 334 is serrated, providing a plurality of outlet openings 335 via which air supplied to corrugation 333 by passage 325 is discharged along the convex face 336 of the exducer portion of the blade, which not only film cools the exducer portion of the blade but also tends to activate the stagnant boundry layers.

As previously described, the radially extended web 207 of labyrinth seal 206 extends adjacent to the larger diameter end face of hub 315 and terminates in a peripheral lip 208. As seen in FIG. 22, lip 208 directly engages the adjacent side face of rim 327. Just inwardly of rim 327, hub 315 is provided with a plurality of circularly spaced ports 337 each communicating between the space between seal lip 207 and hub 315, on the one hand, and a different one of the passages 325, on the other hand. Inwardly of the circular series of ports 337, the end face of hub 315 is recessed, as indicated at 338, with the recess opening toward web 207 and provided with radial vanes 339. Adjacent plug 168, bolt shaft member 146 and shaft 8 are provided with radial bores 340 communicating between the interior of member 146 and the space between seal web 207 and hub 315. Accordingly, air supplied through member 146 as later described is conducted to the space between web 207 and hub 315 and passing through recess 338 and in contact with vanes 339, cools this portion of the hub before being supplied to passage 325 via ports 337 to cool the rotor blades 316. At the opposite end of the hub, a cup-shaped annular member 341 is secured to extension 130 and has its lip 341a engaged with the outer peripheral portion of the end face 342 of the hub. Shaft member 146 and extension 130 are provided with aligned radial bores 343 and 344, respectively, to supply air to the space between member 340 and the hub. Lip 341a is provided with circularly spaced notches 345 via which cooling air is discharged outwardly.

During operation of the engine, the critical portion of each blade 316 is cooled by the air supplied from passage 325 through the channels defined by corrugations 324, while the less critical exducer portion is cooled by the air discharged through openings 335. Further, air discharged through openings 335 inhibits formation of a boundary layer of air along the convex face 336.

Rotor 6 can advantageously be made by rough forming the space between portions 321, 322 of each blade, either by casting or by preliminary removal of metal by laser cutting, and the space can then be finished by precision machining. Integral rotor and blade structures embodying the features of the above cooling means and minimum mass can also be constructed in other manners.

Wire 329 advantageously is very slightly wider than the space between blade portions 321 and 322, is initially forced into place and into engagement with surfaces 330 of member 323, and is then secured, advantageously by electron beam welding, both to portions 321, 322 and to member 323. Wire 332 is installed in the same manner, advantageously being electron beam welded both to portions 321, 322 and to member 323 at corrugation 333. Though its engagement with and attachment to wires 329, 332 and with the hub at locator points 326, 328 locks member 323 in place, the crests of the corrugations of member 323 are advantageously brazed to the inner surfaces of flat blade portions 321, 322, both to restrain the core member against expansion at right angles to the corrugations and to improve heat transfer from portions 321, 322 to the core member.

Extension 130 of rotor 6, acting as part of the main turbine shaft, is journalled in a conventional anti-friction bearing 350 carried by the combination of member 44, which forms a part of casting 9, hollow bolts 351, and member 45.

POWER TURBINE

At its inner periphery, member 44 includes an axial projecting tubular portion 352 which embraces the axial projecting end of portion 277 of shroud member 42, Belleville washers 353 being provided between the end of portion 352 and an opposing transverse annular shoulder on portion 277 to accommodate thermal expansion and contraction. Hollow bolts 351 extend through aligned openings in members 44 and 45, projecting beyond member 45 to extend through and be plugged and welded to the thin back shroud member 354 of the power turbine. Shroud member 354 has an outer tubular flange 355 embraced by and shouldered against the outer tubular portion 356 of member 45 which forms one side of nozzle vane passage 46. Save for the openings for bolts 351, shroud member 354 is imperforate. Thus, member 354 presents a continuous wall extending between the adjacent ends of shafts 12 and 85. Further, member 45 and shroud member 354 cooperate to define a space 357 which is supplied with cooling air from the space within wall member 35 via openings 358 in the hollow bolts 351. Since the space within bolt shaft member 146 opens directly into space 357, air supplied via bolts 351 is conducted via shaft member 146 to drive turbine hub 315 to cool the drive turbine as hereinbefore described.

At the downstream end of passage 43, member 44 extends frusto-conically to provide an annular wall portion 44a which tapers outwardly toward heat exchanger 5 and cooperates with member 45 to define nozzle vane passage 46 and with the hub of rotor 11 to define the rotor blade passage of the power turbine. Nozzle vanes 359 are cast integrally with member 45. Outer portion 356 of member 45 is provided with a plurality of radial bores 360 at each nozzle vane, bores 360 opening inwardly into space 357 and extending outwardly completely through the nozzle vane. Accordingly, part of the air supplied to space 357 via openings 358 flows outwardly through bores 360 to cool both the tubular portion 356 and the vanes 359.

Inwardly of the circular series of bolts 351, the face of member 45 directed toward the power turbine rotor is provided with a plurality of radial grooves 361 which allow offset portion 362 of shroud member 354 to bear directly on member 45 without interrupting space 357. At their inner ends, grooves 361 communicate with axial grooves 363 in the wall of the bore through member 45 which embraces the retainer for bearing 350. At its opposite face, member 45 is provided with radial grooves 364 each communicating with one of the axial grooves 363. Grooves 364 are covered by a sheet metal wall member 365 which is rigidly secured to member 45, as by brazing. At its inner periphery, member 365 is flanged over member 45, to close the ends of grooves 363. The outer periphery of member 365 is serrated to provide outlet openings (not shown) registered with the outer ends of grooves 364. Accordingly, some of the air supplied to space 357 travels through grooves 363, to cool bearing 350, and through grooves 364, to cool the face of member 45 exposed to gases flowing through passage 43.

Rotor 11 includes a hub 366 bolted to flange 367 on shaft 12, and blades 368. The turbine is completed by a thin front shroud member 369 secured, as by brazing, to an inturned end flange on shell 48, the latter member being secured at its inner periphery to plate 24, as by ring 370 and screws 371. Member 35a is an annular sheet metal member having outwardly projecting end flanges 372, 373. The portion of casting 9 which forms the juncture between portions 35 and 44a presents a flat transverse annular face directed toward heat exchanger 5, and flange 372 is secured thereto in fluid-tight fashion by ring 374 and screws 375. Flange 373 is secured in fluid-tight fashion to plate 24 by ring 376 and screws 377. As will be apparent from comparing FIGS. 5 and 25, the larger diameter end of member 35a, at flange 373, surrounds the exhaust gas inlet openings 33, 34 in plate 24.

HEAT EXCHANGER

Heat exchanger disc 52 comprises an inner hub 380 which has a right cylindrical main inner surface terminating in an internally threaded portion 382 at each end of the hub. Portions 382 cooperate with externally threaded nuts 383. The main inner surface of the hub is provided with a plurality of axial grooves 378, all of which communicate with transverse manifold grooves adjacent each nut 383. Each nut 383 is provided with a pair of diametrically opposed radial grooves 379 which communicate between the corresponding manifold groove and the space surrounded by the nut. Carbon bearing 57 is engaged between nuts 383 and embraced by the main inner surface of hub 380. The cylindrical inner surface of bearing 57 embraces the main cylindrical surface 384 of support member 54, the outboard end of member 54 being enlarged to provide a shoulder 385, and the inboard end thereof carrying an elongated cylindrical sleeve 386 retained on support member 54 by a nut 386a. A metal thrust ring 387 is disposed between bearing 57 and shoulder 385, and a second ring 388 is disposed between the other end of bearing 57 and the adjacent end of sleeve 386, an axially resilient ring 388a being disposed between ring 388 and sleeve 386. The outer face of ring 387 is provided with radial grooves 389 and the inner face of the ring has axial grooves 390, the corner of the ring between those faces being bevelled so that grooves 389 communicate with grooves 390. Ring 388 has internal axial grooves 391 which communicate with internal axial grooves 392 which extend for the full length of sleeve 386, the bore of seal 388a being suitably grooved.

At its outer end, support member 54 includes an enlarged cylindrical portion 395 and an end flange 396 the inner face of flange 396 defining an annular recess 397, and portion 395 presenting a right cylindrical outer surface extending between flange 396 and shoulder 385. Plate 20 is secured to flange 396 by screws 398 and projects inwardly across recess 397. A tubular sheet metal sleeve 399, serving as a heat shield, has its outwardly projecting end flange 400 secured to the outer face of plate 20 by screws 401, the main tubular body of sleeve 399 surrounding the outer surface of portion 395 and projecting over the inner face of the corresponding nut 383, which face is grooved to provide a labyrinth seal. Casing 15 includes a transverse cover member 402 spaced outwardly from plate 20 and secured both to flange 396, by screws 398, and to end flange 403 of the cylindrical portion 404 of casing 15 which surrounds heat exchanger 5 and cooperates with wall member 17 to define a portion of the outer tubular passage 14. Accordingly, the space between plate 20 and cover member 402 constitutes an extension of passage 14. Flange 396 is provided with radial grooves 405 communicating between the space between plate 20 and cover member 402, on the one hand, and recess 397, on the other hand. Cool air directly from the compressor is thus supplied via grooves 405 and recess 397 to the space between heat shield 399 and portion 395 or mmber 54. This cooling air flows through grooves 389 and 390, through the working space between bearing 57 and surface 384, and through grooves 391 and 392, discharging into the space within member 48, FIG. 5. This space communicates with power turbine diffuser passage 47 via the space between shroud 369 and the power turbine rotor hub 366. Cool air from grooves 405 also flows via grooves 379 in nut 383 into grooves 378 to cool the outer surface of bearing 57, that air escaping via the radial grooves in the right hand (as viewed in FIG. 6) nut 383 into the space surrounding sleeve 386, and discharges into the space within member 48. It will be noted that, at the end of the heat exchange disc 52 adjacent plate 24, there is no element corresponding to heat shield 399. Accordingly, this area is left free for stiffening bars 393, FIGS. 6 and 25, to project inwardly to the outer surface of sleeve 386. Bars 393 are welded both to plate 24 and sleeve 386.

Heat exchanger disc 52 also comprises an outer annular member 406 and a heat exchange matrix indicated generally at 407. As will be apparent from FIG. 28, matrix 407 comprises two thin metal sheets 408, 409 each having a width equal to the axial thickness of disc 52. Sheet 408 is corrugated, the corrugations extending transverse to the length of the sheet and having a cross-sectional shape essentially in the form of an equilateral triangle. Sheet 409 is uncorrugated. The two sheets are placed together, with sheet 409 covering the corrugations of sheet 408 to form channels 410 extending across the full width of the sheets. The two sheets are wound into a closed spiral, i.e., a spiral in which the uncovered crests of the corrugations of sheet 408 in each convolution are in direct live contact engagement with sheet 409 of the next adjacent outer convolution. The spiral has an effective radial thickness to completely fill the annular space between hub 380 and outer member 406.

The outer surface of hub 380 is of outwardly convex radial cross-sectional shape. The inner face of member 406 is of inwardly convex radial cross section. The outer and inner surfaces of matrix 407 are generally right cylindrical when the matrix is cool and therefore has its normal undistorted shape. Accordingly, when the matrix is cool, the central portion of inner surface of the matrix and the central portion of the outer surface of hub 380 are in essentially face-to-face contact, though the outer surface of the hub curves inwardly away from the matrix toward the ends of the hub. Similarly, the central portions of the outer surface of the matrix and the inner surface of member 406 are in essentially face-to-face contact, while the inner surface of member 406 curves outwardly away from the matrix toward the ends of member 406. The adjacent convolutions of the matrix are brazed together, the central portion of the inner surface of the matrix is brazed to the central portion of the outer surface of hub 380, and the central portion of the outer surface of the matrix is brazed to the central portion of the inner surface of member 406. Since only the central portion of the matrix is brazed to the hub and the outer ring, and since the adjacent surfaces of those members curve away from the matrix, space is available for the end portions of the matrix, i.e., the portions adjacent faces 411 and 412, to expand and contract radially. Such freedom of expansion and contraction avoids distortion of the matrix from differential thermal expansion. The corresponding end faces of hub 380 and member 406 lie in common flat planes at right angles to the axis of member 54. The faces 411, 412 of matrix 407 are ground to lie in the common planes just mentioned.

For each air inlet opening 27, 28 in plate 20 and for each air outlet opening 29, 30 in plate 24, heat exchanger 5 includes a non-rubbing seal device indicated generally at 413 and constructed and arranged to confine the air supplied through openings 27, 27 to cylindrical spaces extending respectively between openings 27 and 28 and the respective openings 28 and 30. Save for their position in the heat exchanger, all four seal devices 413 are identical and only the seal device associated with air inlet opening 27 will be described in detail. The seal device comprises a flat plate 414, FIGS. 3, 6 and 26, an inner ring 415 which is concentric with and spaced outwardly from portion 395 of member 54 and conforms to the adjacent end face of hub 380, an outer arcuate bar 416 conforming to the adjacent end face of outer ring 406, two bimetal bars 417, and a resilient bellows 418. Plate 414 has an inner arcuate edge portion 419 secured to ring 415 by screws 420, two outwardly divergent side edges, and an outer arcuate edge portion 421 secured to bar 416 by screws 422. Each bar 417 is made up of two coextensive straight metal bars 423, 424 brazed together face-to-face and secured to one of the straight side edge portions of plate 414 by screws 425 which extend freely through bores in bar 423 and have their threaded tips engaged in threaded blind bores in bar 424. The inner end faces of bars 417 are secured, as by brazing, to the surface of ring 415, each bar extending along a line which is chordal with respect to ring 415.

Figure 6:
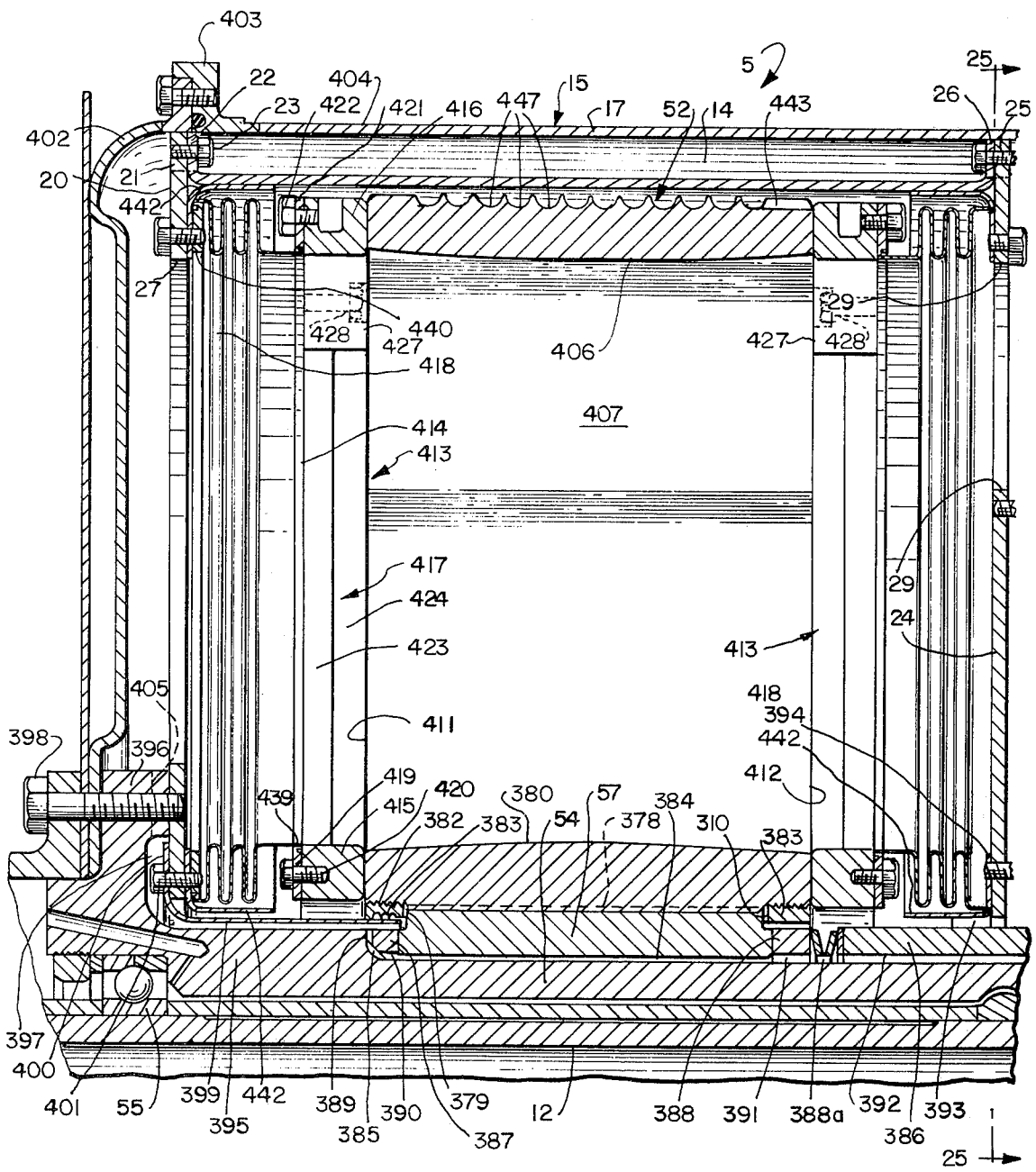
FIG. 6 is a fragmentary longitudinal sectional view of the remaining portion of the engine.

As seen in FIG. 3, plate 414 is laterally enlarged at the outer end of each bimetal bar 417 to accommodate pillow blocks 426 which are secured to plate 414 by mounting blocks 427, FIG. 6, and screws 428. While the outer end portion of plate 414 extends across arcuate bar 416, the bimetal bars 417 terminate at the inner face thereof and the two mounting blocks 427 for each pillow block are disposed each on a different side of the end portion of bat 417. Journalled in each pillow block 426 is a shaft 429, FIG. 26, carrying a roller 430, the shaft extending radially relative to heat exchanger disc 52 and the roller being accommodated by a slot 431 in bar 416. The diameter of roller and the position of shaft 429 relative to plate 414 is such that, with rollers 430 in rolling contact with the end face of outer ring 406 of disc 52, and ring 415 spaced just from or in very light sliding engagement with the adjacent end face of hub 380, bars 417 are parallel to the adjacent face of matrix 407 and spaced therefrom by, e.g., 0.003 in.

The combination of pillow block 426 and roller 430 is enclosed by a thin sheet metal heat shield 432, FIG. 26, having a peripheral flange 433 fixed by screws to the outboard face of plate 414. Outwardly of bar 416, shell 432 includes a flat wall 434 which extends past bar 416 so that its free edge is spaced slightly from the end face of ring 406. Shaft 429 has a through bore 435 and a plurality of radial bores 436, one of the radial bores communicating through an opening in the pillow block with the interior of a bellows 437, one end of bellows 437 being secured to the pillow block and the other to plate 20. Plate 20 is provided, for each pillow block assembly, with a bore 438 communicating between passage 14 and the interior of bellows 437. Accordingly, cooling air from passage 14 is supplied through bellows 437 to the bores 435, 436 to cool the pillow block and roller, this air escaping outwardly past the adjacent end face of ring 406.

Plate 414 has a circular opening 439, FIGS. 3 and 6, which lies between bimetal bars 417. Bellows 418 has one end secured to plate 414, as by electron beam welding, and the other end similarly secured to a ring 440 fixed to the inner face of plate 20 by screws 401. Bellows 418 surrounds openings 27 and 439, so that cool air passing from passage 14 through opening 27 is conducted via the seal device 413 to the adjacent face of matrix 407, the small clearance between the combination of ring 415, bimetal bars 417 and bar 416, on the one hand, and the heat exchanger disc 52, on the other hand, being such that the air is constrained to flow through the matrix, with the seal device 413 which is associated with opening 29 in plate 24 operating in similar fashion to assure that the air, now heated by contact with matrix 407, is directed through opening 29 into passage portion 36.

Each bellows 418 is surrounded by a sheet metal heat shield 442 having an inturned flange secured to the inboard face of plate 20 by screws, including appropriate ones of the screws 401. The tubular body of heat shield 442 projects inwardly, terminating short of plate 414 and serving to substantially insulate the bellows 414 from the surrounding exhaust gas.

Adjacent face 412 of matrix 407, outer ring 406 is provided with gear teeth 443, FIG. 6, meshed with the teeth of a pinion 444, FIG. 3, driven by electric motor 53, so that heat exchanger disc 52 is rotated continuously about support member 54 as the engine operates. To provide for engagement between pinion 444 and gear teeth 443, wall member 17 is provided with an opening 445, FIG. 3, and drive pinion 444 is enclosed by a sealed housing 446 so that air cannot escape through opening 445 from passage 14. The outer face of ring 406 is provided with circumferential grooves 447, FIG. 6, which open toward wall number 17 to provide a labyrinth seal between disc 52 and wall member 17.

During operation of the engine, with heat exchanger disc 52 rotating, hot gas from the power turbine entering the gas inlets 33, 34 and air from the compressor entering the air inlets 27, 28, the end of heat exchanger disc 52 at the inboard matrx face 412 is substantially hotter than the end of the heat exchanger at the outboard matrix face 411. Accordingly, disc 52 tends to warp spherically, with matrix face 411 tending to become outwardly concave and matrix face 412 tending to become convex. The temperature differential across matrix 407 is substantial. Thus, in this embodiment, the temperature at matrix face 412 can be on the order of 1200°–1400° F., while the temperature at matrix face 411 is on the order of 600°–800° F. The amount of warpage resulting from such temperature differentials is significant, and the small clearage between the seal devices 413 and the matrix faces would be lost, with resulting mechanical interference and rubbing, were the seal devices not temperature compensating.

For the seal devices 413 at air inlet openings 27 and 28, bar 423 of each bimetal bar 417 is of a metal having a thermal coefficient of expansion greater than that of the bar 424 of each bimetal bar. Since the two seal devices which are respectively associated with inlet openings 27 and 28 are joined together by inner ring 415, the combination of ring 415 and the bimetal bars 417 of the two seal devices acts as a beam extending diametrically relative to disc 52, and this difference in thermal coefficient of expansion between bars 423 and 424 causes this combination to warp substantially circularly in the same mode as the disc warps spherically, i.e., the outboard side of the combination of disc 415 and the two seal devices becomes outwardly concave.

For the seal devices 413 at air outlet openings 29 and 30, the bar 424 of each bimetal bar 417 is of a metal having a higher thermal coefficient of expansion than the metal from which the bar 423 of that bimetal bar is made. The bimetal bars 417 of these two seal devices are again joined by inner ring 415, so that the combination of bimetal bars and inner ring acts as a diametrically arranged beam. With bars 424 of the seal devices at this end of the disc 52 having the higher thermal coefficient of expansion, the combination of bimetal bars and inner ring tends to warp in the same mode as matrix face 412, i.e., the inboard side becomes convex, as viewed from the cold end of the engine.

The difference in thermal coefficient of expansion for the bars 423 and 424 is carefully predetermined to provide warpage of the seal device-inner ring combination, at each end of the heat exchanger disc exhibited at the faces of the matrix 407, since both the heat exchanger disc 52 and the bimetal bars 417 are subjected to essentially the same temperature under all conditions of operation. The small, typically 0.003 in., clearance between the seal devices 413 and the adjacent matrix faces is thus preserved.

Figure 7:
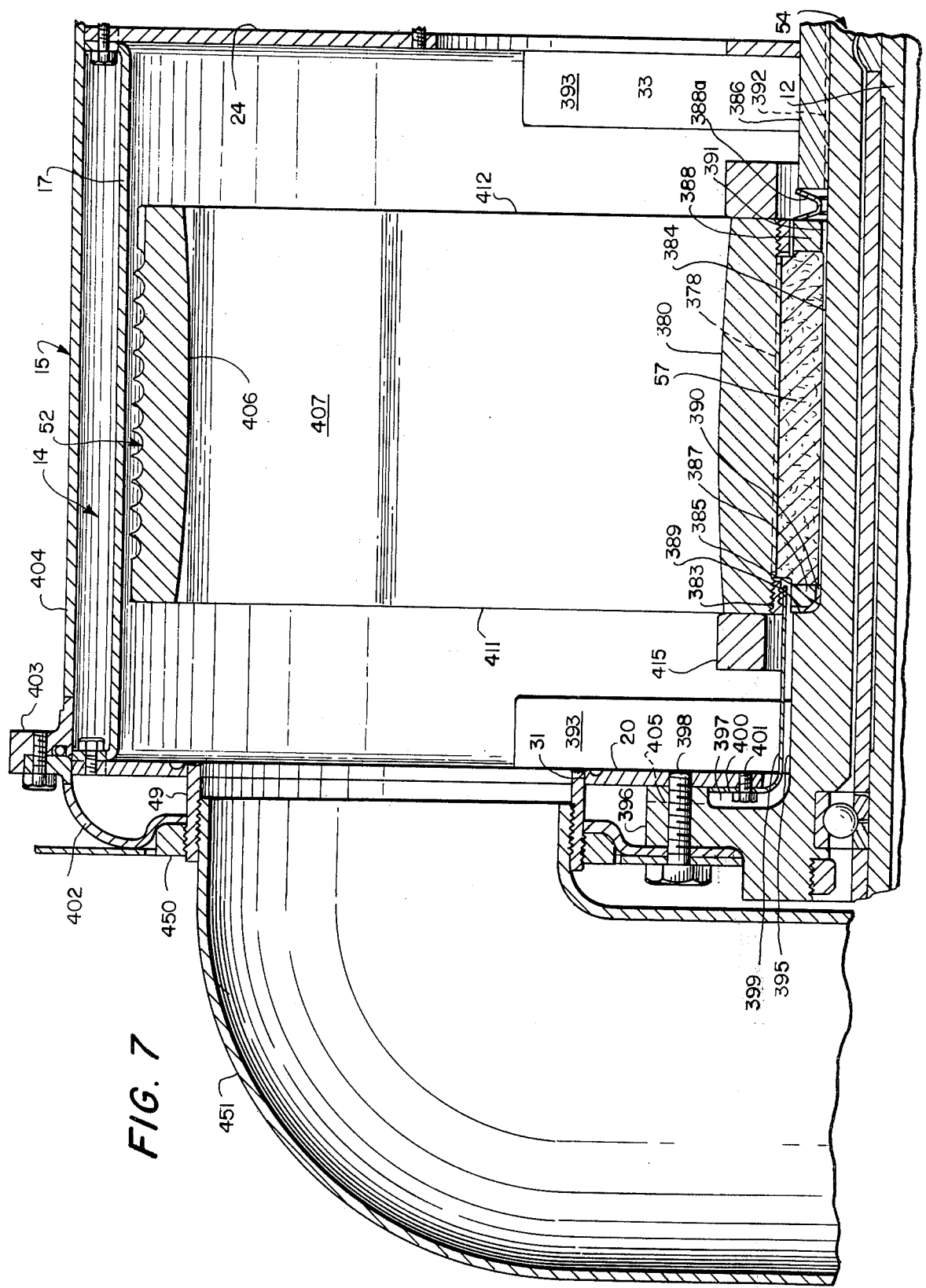
FIG. 7 is a view similar to FIG. 6 but taken on line 7—7, FIG. 3.

As seen in FIG. 7, exhaust gas inlets 33, 34 in plate 24 open directly into the space between plate 24 and heat exchanger disc 52, no seal devices being employed. Thus, the exhaust gas fills all of this space not occupied by seal devices 413 and is free to pass through those portions of the matrix 407 not sealed off by devices 413. After passing through the matrix, the exhaust gas enters the space between the heat exchanger disc 52 and plate 20, there being no seal devices at exhaust gas outlet openings 31, 32. The short cylindrical exhaust tubes 49, 50 are rigidly secured to plate 20, as by welding, and project outwardly through openings in end cover 402, the outer end portions of tubes 49, 50 being externally threaded to accommodate nuts 450 which bear against the outer face of cover 402. An elbow 451 of the exhaust system 51 is secured, as by screw threads, in the outer end portion of each tube 49, 50.

Located between elbows 451, gear box 13 is rigidly secured to flange 396 of member 54 and is therefore supported by the combination of member 54, plates 20 and 24, and wall member 17. The reduction gear box can be conventional, comprising an input pinion gear 452, FIG. 1, secured to power shaft 12, and an output gear 453 having a splined tubular hut 454 adapted to mate with, e.g., the input shaft of a standard vehicle transmission.

What is claimed is:

1. In a rotary heat exchanger, useful as a regenerator for gas turbine engines, the combination of a rotary disc comprising:
    hub means at the center of the disc and having an outer surface which is of outwardly convex radial cross-sectional shape,
    an annular member forming the outer periphery of the disc and having an inner surface of inwardly convex radial cross-sectional shape, and
    a heat exchange matrix comprising two elongated thin metal sheets each having a width equal to the axial thickness of the matrix, one of said sheets being transversely corrugated and the other being uncorrugated, said sheets being disposed in mutual face-to-face engagement and arranged in a closed spiral which is concentric with the axis of rotation and in which the uncovered crests of the corrugations of said one sheet in each convolution of the spiral are in contact with said other sheet in the next adjacent convolution of the spiral, the edges of said sheets at each side of the disc lying in a common plane and constituting the face of the matrix,
    said spiral having an effective radial thickness such as to completely fill the annular space between said hub means and said annular member,
    the inner and outer surfaces of said matrix being generally right cylindrical when the matrix is cool and undistorted,
    the central portions of the inner and outer surfaces of said matrix being affixed to the central portions of said outer surface of said hub means and said inner surface of said annular member, respectively; and a
    stationary seal device disposed adjacent one of the faces of the matrix constituted by the edges of said sheets, said seal device being constructed and arranged to enclose an air flow space through which air under pressure can be supplied to the matrix in a direction parallel to the axis of rotation of the disc, said seal device comprising:
    bimetal means extending at least generally along a diameter of the matrix in close proximity to but out of contact with said one face, said bimetal means being operative to wrap the seal device in conformity to said one face of the matrix as the matrix warps under the influence of temperature changes, whereby close proximity of the seal device to the matrix is preserved and rubbing of the matrix against the seal device is avoided.

2. The combination defined in claim 1, and further comprising:
    a stationary ring located at the end of said hub means which is adjacent said one flat face of said matrix, said bimetal means comprising at least one bimetal bar secured to said ring and extending outwardly therefrom; and
    anti-friction means carried by the outer end of said at least one bimetal bar and bearing against the adjacent end of said annular member.

3. In a rotary heat exchanger useful as a regenerator for gas turbine engines, the combination of a rotary disc comprising:
    hub means located at the center of the disc and having an outer surface which is of outwardly convex radial cross-sectional shape, an annular member forming the outer periphery of the disc and having an inner surface of inwardly convex radial cross-sectional shape, and
    an integrated axial through flow heat exchange matrix which, when cool and undistorted, has generally right cylindrical inner and outer peripheral surfaces and two circular major faces which are flat and lie in planes transverse to the axis of rotation of the disc,
    said matrix defining heat exchange passages extending from one of said major faces to the other and through which gas can flow in heat exchange relation to the matrix,
    said matrix, when cool and undistorted, having an effective thickness, in a plane intermediate said major faces, such as to completely fill the annular space between said hub means and said annular member in said intermediate plane, the intermediate portions of said inner and outer surfaces of said matrix being affixed to the intermediate portions of said outer surface of said hub means and said inner surface of said annular member, respectively,
    said matrix, when heated, expanding radially in the portions thereof adjacent said major faces, with space for such expansion being afforded by the fact that the radial distance between said onvex surfaces increases from said intermediate portions toward said major faces, such expansion being accompanied by a corresponding bowing of said major faces; and
    a stationary seal device mounted adjacent one of said major faces of said matrix, said seal device being constructed and arranged to enclose a gas flow space through which gas under pressure can be supplied to the matrix in a direction parallel to the axis of rotation of said disc, said seal device comprising:
  bimetal means extending at least generally along a diameter of the matrix in close proximity to but out of contact with said one major face,
  said bimetal means being operative to warp the seal device in conformity to said one major face of said matrix as that face warps under the influence of temperature changes, whereby close proximity of the seal device to said one major face of the matrix is preserved and rubbing of the matrix against the seal device is avoided.

4. The combination defined in claim 3, wherein:
said hub means has an annular end face adjacent said one major face of said matrix; and
said annular member forming the outer periphery of the disc has an annular end face adjacent said one major face of said matrix,
the combination further comprising:
  a ring located adjacent said end face of said hub means, said ringbeing concentric with the axis of rotation of the disc; and
  stationary means supporting said ring independently with respect to the rotary disc,
  said bimetal means comprising at least one bimetal bar secured to said ring and extending outwardly therefrom to a location adjacent said end face of said annular member forming the outer periphery of the disc.

5. The combination defined in claim 4, wherein:
said bimetal means comprises two bimetal bars each secured at one end to said ringe,
said two bimetal bars divering outwardly from each other; and
said seal device further comprises:
  an arcuate outer member disposed adjacent said end face of said annular member forming the outer periphery of the disc,
  the outer ends of said two bimetal bars being connected to said arcuate outer member, and the combination of said bars, said ring and said arcuate outer member being interconnected as a unit defining a gas flow space.

6. The combination defined in claim 5, wherein said seal device further comprises:
  roller means carried by said arcuate outer member and disposed in rolling engagement with said end face of said annular member forming the outer periphery of the disc.

7. The combination defined in claim 5, and further comprising:
  a second stationary seal device mounted adjacent said one major face of said matrix in a location spaced from said first-mentioned seal device, said second seal device comprising:
    two bimetal bars each connected at one end to said ring and extending outwardly therefrom in mutually divergent fashion, and
    an arcuate outer member disposed adjacent said end face of said annular member forming the outer periphery of the disc,
    the outer ends of the two bimetal bars of said second seal device being connected to said last-mentioned arcuate outer member.

8. The combination defined in claim 7, and further comprising:
  a stationary shaft on which said jub means is journalled;
  a first tutublar member surrounding and closely adjacent said annular member which forms the outer periphery of the disc;
  a support plate fixed to said stationary shaft and extending outwardly therefrom generally parallel to and spaced axially from said one major face of said matrix,
  said seal devices being located between said support plate and said matrix,
  said first tubular member being secured to said support plate,
  said support plate having two gas inlet openings each alinged with a different one of said seal devices;
  a wall member fixed to said stationary shaft and spaced from said support plate on the side thereof opposite said seal devices;
  two axiallly distortable tubular members each having one end connected to a different one of said seal devices and the other end fixed to said support plate and communicating with a different one of said gas inlet openings of said support plate; and
  means for supplying gas under pressure to the space between said support plate and said wall member.

9. The combination defined in claim 8, wherein:
said last-mentioned means comprises:
  a second tubular member generally concentric with and spaced outwardly from said first tubular member, said second tubular member being secured to said support plate;
  said wall member being joined at its outer periphery to said second tubular member;
  the annular space between said first and second tubular members being in communication with the space between said support plate and said wall member.

10. The combination defined in claim 8, wherein:
said hub means comprises a bearing journalled on said stationary shaft,
the combination further comprising:
  flow means constructed and arranged to receive gas from the space between said support plate and said wall member and to direct that gas in cooling flow relative to said hub means.

11. The combination defined in claim 3, wherein:
said hub means has an annular end face adjacent said one major face of the matrix; and
said annular member forming the outer periphery of the disc has an annular end face adjacent said one major face of the matrix,
the combination further comprising
a stationary member disposed adjacent said annular end face of said hub means,
said seal device further including
  an outer arcuate member located adjacent said end face of said annular member forming the outer periphery of the disc,
  said bimetal means comprising a bimetal bar secured to said stationary member and extending outwardly to the location of said outer arcuate member, and
  connection means forming part of said seal device and connecting the outer end of said bimetal bar to said outer arcuate member.

12. The combination defined in claim 11, wherein:

said outer arcuate member is flat and lies in a plane parallel to and closely adjacent said end face of said annular member forming the outer periphery of the disc; and said connection means is constructed and arranged to allow relative movement between the outer end of said bar and said outer arcuate member, whereby said outer arcuate member can retain its parallel relationship with said end face during warping of the seal device by said bar.

13. The combination defined in claim 12, wherein: said connection means includes a flat plate extending across the surfaces of said outer arcuate member and said bar on the side thereof opposite the disc, said plate being secured to said outer arcuate member and to said bar.

* * * * *